(12) United States Patent
Liu

(10) Patent No.: US 12,361,083 B2
(45) Date of Patent: Jul. 15, 2025

(54) RELATIONSHIPS MANAGEMENT SYSTEMS, METHODS, AND APPARATUSES

(71) Applicant: Hand in Hand Tech, LLC, Mill Creek, WA (US)

(72) Inventor: Hailu Liu, Mill Creek, WA (US)

(73) Assignee: Hand in Hand Tech, LLC, Mill Creek, WA (US)

( * ) Notice: Subject to any disclaimer, the term of this patent is extended or adjusted under 35 U.S.C. 154(b) by 558 days.

(21) Appl. No.: 17/238,034

(22) Filed: Apr. 22, 2021

(65) Prior Publication Data

US 2021/0374202 A1 Dec. 2, 2021

Related U.S. Application Data

(60) Provisional application No. 63/030,031, filed on May 26, 2020.

(51) Int. Cl.
*G06Q 10/10* (2023.01)
*G06F 16/9536* (2019.01)
*G06F 21/60* (2013.01)
*G06F 21/62* (2013.01)
*G06Q 10/06* (2023.01)
*G06Q 30/02* (2023.01)
*G06Q 30/06* (2023.01)
(Continued)

(52) U.S. Cl.
CPC ........ *G06F 16/9536* (2019.01); *G06F 21/604* (2013.01); *G06F 21/6245* (2013.01); *H04L 9/0819* (2013.01); *H04L 9/3228* (2013.01); *H04L 67/306* (2013.01)

(58) Field of Classification Search
CPC ............... G06F 16/9536; G06F 21/604; G06F 21/6245; G06F 21/6218; H04L 9/0819; H04L 9/3228; H04L 67/306; H04L 9/3213; H04L 51/52; H04L 2209/80; H04L 2209/84; H04L 63/102; H04L 63/105; G09C 5/00; G06Q 10/10; G06Q 50/01
USPC .................................. 705/1.1–912, 319, 342
See application file for complete search history.

(56) References Cited

U.S. PATENT DOCUMENTS 8,842,841 B2 * 9/2014 Hook .................... H04L 63/061 380/278
9,495,557 B2 * 11/2016 Paymal ............... G06F 21/6227
(Continued)

FOREIGN PATENT DOCUMENTS

TW 201807624 A 3/2018

OTHER PUBLICATIONS

Lin, Chu-Hsing, "Dynamic key management schemes for access control in a hierarchy", Department of Computer and Information Sciences, TungHai University, Taichung 407, Taiwan, Apr. 23, 1997. (Year: 1997).*

(Continued)

*Primary Examiner* — Jonathan P Ouellette
(74) *Attorney, Agent, or Firm* — Lee & Hayes, P.C.

(57) ABSTRACT

Relationships management systems, methods, and apparatuses are discussed herein. Techniques may include establishing, in a relationships management system, a user profile. The user profile may be associated with at least a first access level comprising a first plurality of functions and a second access level comprising a second plurality of functions. The first access level and the second access level may be defined based at least in part on input via a user interface.

20 Claims, 16 Drawing Sheets

(51) Int. Cl.
*H04L 9/08* (2006.01)
*H04L 9/32* (2006.01)
*H04L 67/306* (2022.01)

(56) References Cited

U.S. PATENT DOCUMENTS

| | | | |
|---|---|---|---|
| 9,699,187 B2* | 7/2017 | Chen | H04L 51/52 |
| 9,998,497 B2* | 6/2018 | Ylonen | H04L 9/0891 |
| 10,432,394 B2* | 10/2019 | Hook | G06F 21/10 |
| 11,483,147 B2* | 10/2022 | Kurian | H04L 9/14 |
| 2002/0091947 A1 | 7/2002 | Nakamura | |
| 2010/0318571 A1* | 12/2010 | Pearlman | H04L 63/10 |
| | | | 709/204 |
| 2012/0167234 A1* | 6/2012 | Donfried | G06F 21/31 |
| | | | 707/769 |
| 2012/0331568 A1* | 12/2012 | Weinstein | H04L 12/185 |
| | | | 726/29 |
| 2013/0091213 A1* | 4/2013 | Diab | G06Q 50/01 |
| | | | 709/204 |
| 2013/0091280 A1* | 4/2013 | Rajakarunanayake | |
| | | | H04L 67/306 |
| | | | 709/225 |
| 2013/0179951 A1* | 7/2013 | Broustis | H04L 9/0841 |
| | | | 726/6 |
| 2013/0298187 A1 | 11/2013 | Black et al. | |
| 2013/0318347 A1* | 11/2013 | Moffat | H04L 9/0894 |
| | | | 713/168 |
| 2014/0172917 A1 | 6/2014 | Coroy et al. | |
| 2015/0310188 A1* | 10/2015 | Ford | H04L 63/101 |
| | | | 726/28 |
| 2017/0041296 A1* | 2/2017 | Ford | G06F 21/64 |
| 2018/0032938 A1 | 2/2018 | Scriffignano et al. | |
| 2019/0228177 A1* | 7/2019 | Beckman | G06F 21/629 |
| 2019/0253431 A1 | 8/2019 | Atanda | |

OTHER PUBLICATIONS

Akoumianakis, D., "Practice-oriented toolkits for virtual communities of practice", Journal of Enterprise Information Management, 22 (3), 317-345, 2009. (Year: 2009).*

Ahmed, T. (2017). "Expressive power, safety and cloud implementation of attribute and relationship based access control models" ( Order No. 10686276). Available from ProQuest Dissertations and Theses Professional. (2001553847). (Year: 2017).*

M. H. Al-Amin, M. S. Elgamel and A. Abdel-Hamid, "Secure Data Management in P2P Social Networks Using Access Tokens," 2018 14th International Wireless Communications & Mobile Computing Conference (IWCMC), Limassol, Cyprus, 2018, pp. 500-505 , doi: 10.1109/IWCMC.2018.8450345. (Year: 2018).*

PCT Search Report and Written Opinion dtd Jul. 20, 2021 (8 pages).
Office Action for Taiwanese Application No. 110119115, Dated Jan. 3, 2025, 26 pages.

* cited by examiner

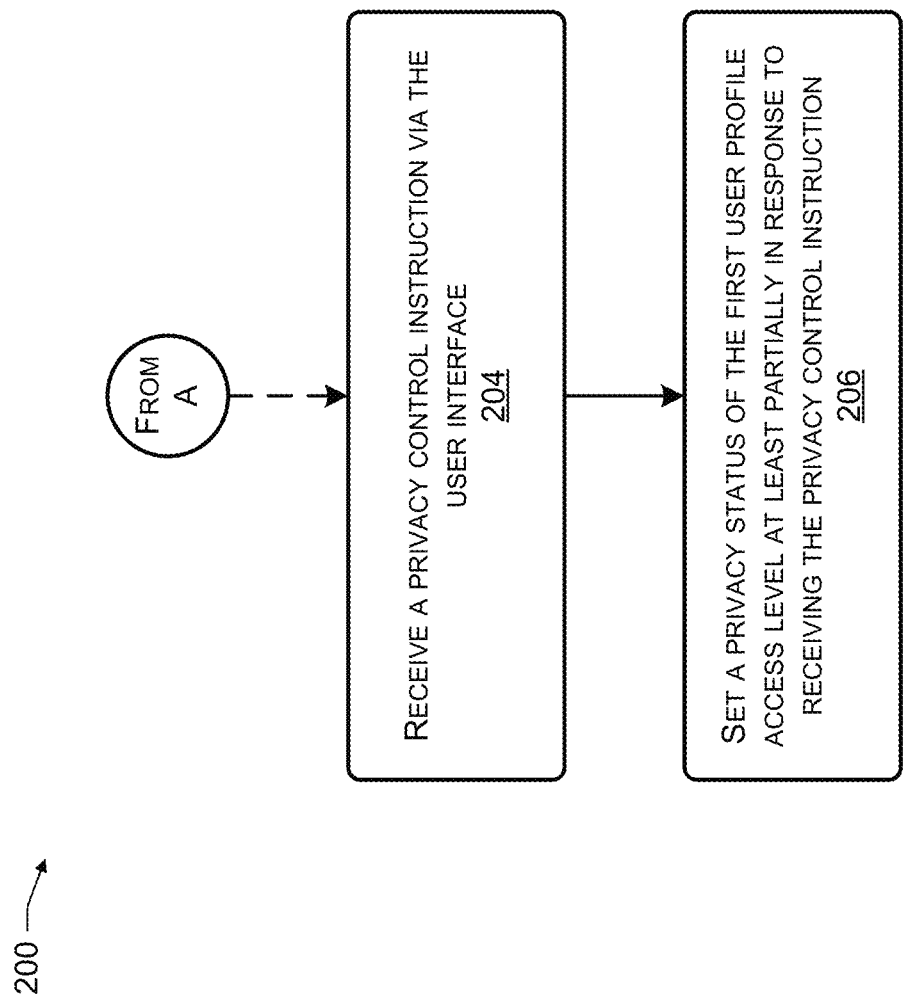

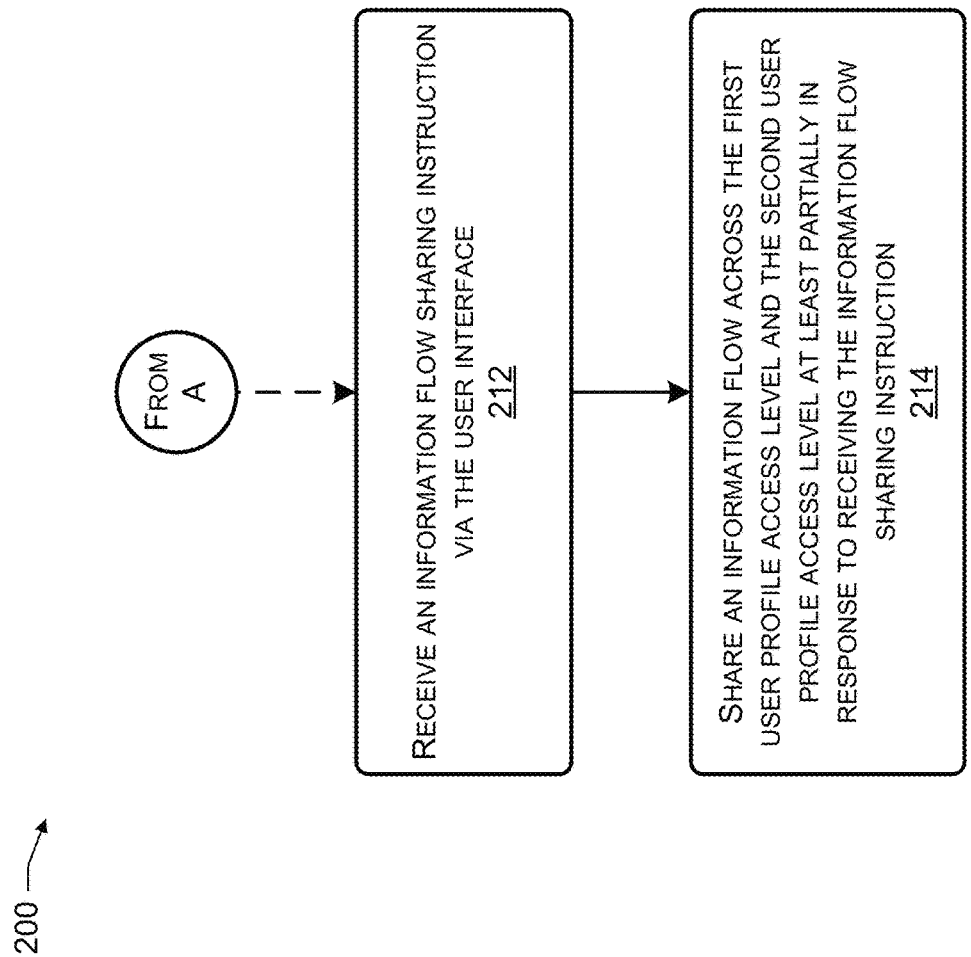

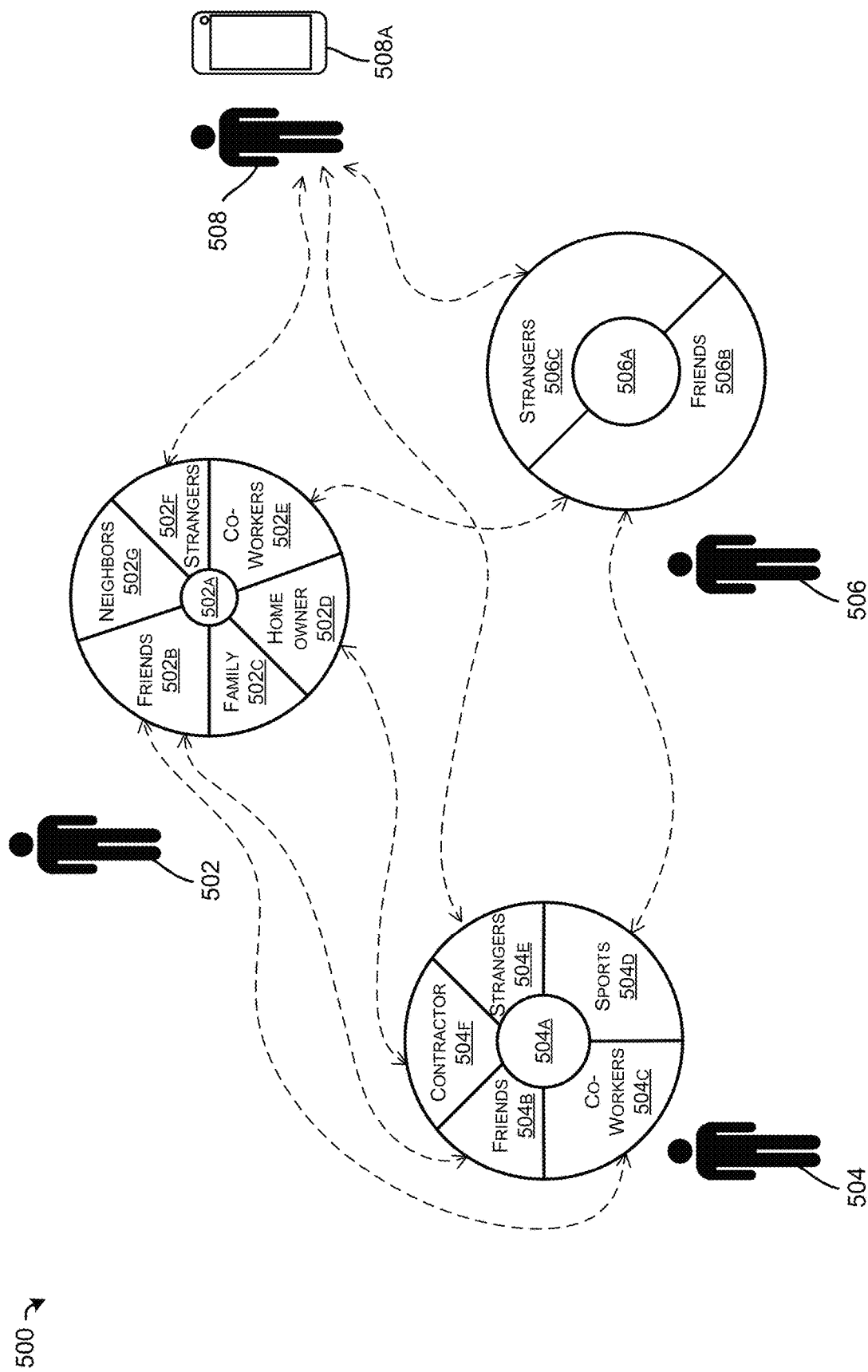

RELATIONSHIPS MANAGEMENT SYSTEMS, METHODS, AND APPARATUSES

CROSS REFERENCE TO RELATED APPLICATIONS

This patent application claims priority filing benefit from U.S. Provisional Patent Application No. 63/030,031, filed on May 26, 2020, which is hereby incorporated by reference, in its entirety.

BACKGROUND

Social media solutions allow users to connect in a variety of ways. However, such social media solutions do not naturally reflect relationships developed over time, nor do they provide a comprehensive solution to manage relationships, activities, and all other aspects of a user's life. Further, disparate social media solutions represent inefficient storage and access of data.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 2A, 2B, 2C, 2D, 2E, 2F, 2G, and 2H illustrate pictorial flow diagrams of a process for managing relationships via a relationships management system.

FIG. 5A illustrates a diagram of example relationships between or among individuals.

DETAILED DESCRIPTION

Figure 1A:
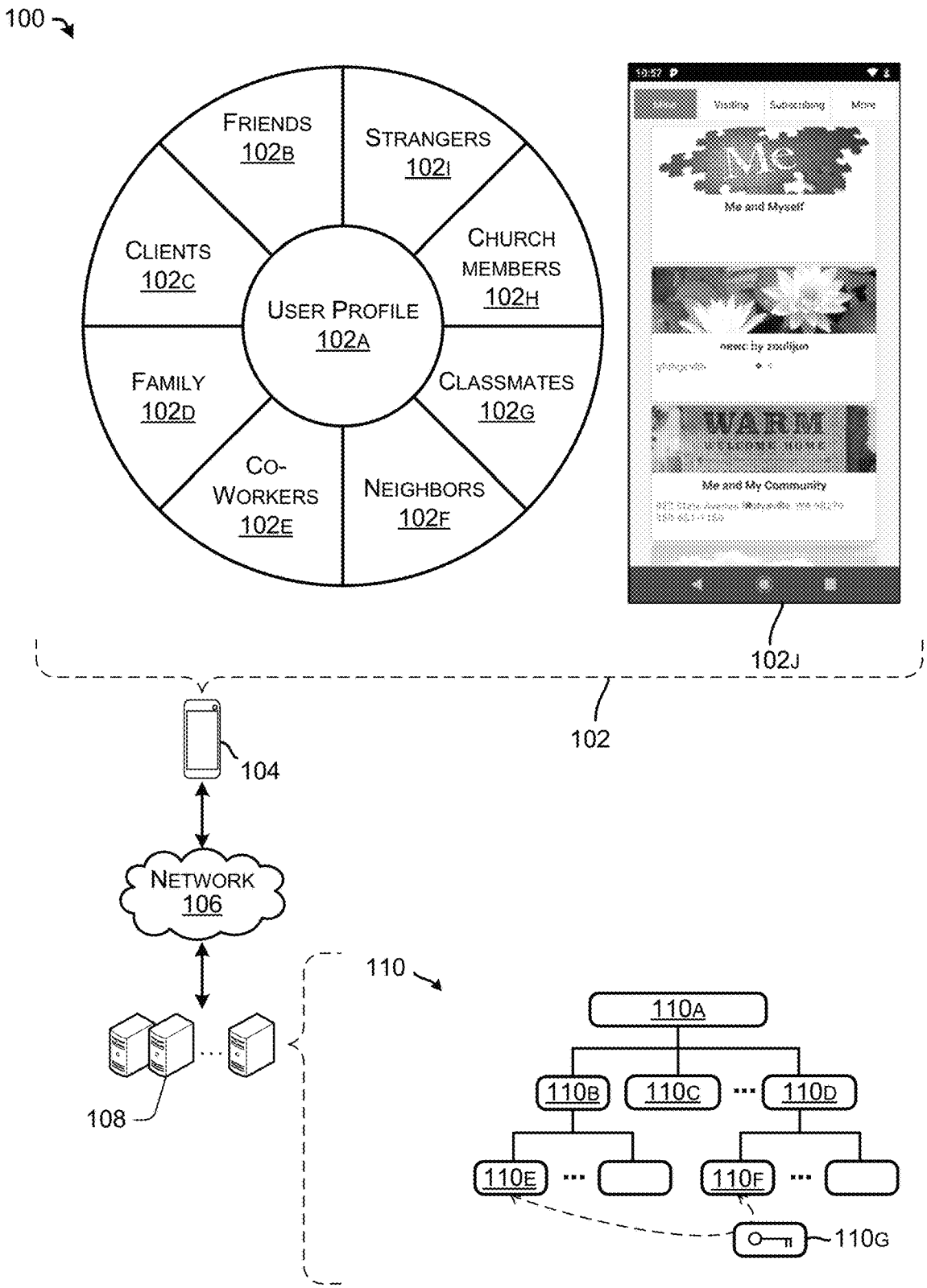
FIG. 1A illustrates a system comprising a relationships management system.

This disclosure is generally directed to relationships management systems, methods, and apparatuses. More particularly, this disclosure is directed to relationships management systems, methods, and apparatuses for improving the efficiency of relationships management.

A relationships management system can be a social media-based platform with functions/algorithms. The relationships management system can be built to improve efficiency in the management of communications, time, money, actions, resources, and all aspects of one's life. The relationships management system can be the imaging tool that can image the real world by representing all kinds of relationships (social connections) in an accurate and optimized way.

As a comprehensive tool, the relationships management system may allow users/developers to maximize the ability to manage some or all of the aspects (relationships and the activities related to that relationship) of one's life in an all-in-one interface by utilizing algorithms. The relationships management system may provide users with a quite different experience than conventional applications (Apps) can do. For example, to keep one in touch by using the conventional Apps, users must often be associated with other users (e.g., as a "friend"), which may not accurately reflect a relationship. This inaccuracy is often due to the limitation of a relationship definition, which is carried out by the only predefined and provided relationship template in the conventional App. Thus, conventional Apps based on predefined relationships cannot reflect reality accurately and can present issues to users when users deal with multiple relationships that reflect the world in which users live.

To reflect the reality, the relationships management system of the instant disclosure gives the right of the relationship definition (and also the management) to the user by providing a customized approach to an access level to represent (e.g., image) one relationship in which a group of people is connected for a specific reason (e.g., a shared attribute or a common interest). Furthermore, the user can apply a combination of customized access levels to represent (e.g., image) multiple relationships as a reflection of one's social life for real in an optimized way.

To manage one's life is a multi-task and multi-facet process that involves many moving parts including communicating with loved ones, coordinating with co-workers, paying bills, scheduling events, categorizing memos, documenting records, planning careers, running a business and maintaining amongst a long list of other items. The relationships management system may provide a dynamic environment that allows efficient management to yield to relationships that represent one's personae, all aspects of a person's life.

The relationships management system discussed herein can improve functioning of a computing device by providing an efficient storage framework and access mechanism for accessing content across various access levels. Keys/tokens may be used to indicate whether an access level has authority to access data associated with another access level. For example, within the relationships management system, an access level may access data associated with another access level based on the keys/tokens, such that data duplication may be reduced or minimized. Moreover, different access levels may share storage space based on the keys/tokens, so as to provide efficient access across various access levels. Furthermore, the user may control the privacy status of the information in each access level and only share the information he/she wants to share with one or more people, improving privacy and security. These and other improvements to the functioning of the computer are discussed herein. Privacy in control, but not to control the privacy.

Moreover, the relationships among users and/or nonusers may or may not be equal. For example, the attributes of relationships may include imaging, visiting, or subscribing, which may be managed via a Dynamic Keys Management Tool (DKM). Additional details of the DKM are described throughout this disclosure. In some instances, the imaging relationship is an equal relationship. The imaging relationship may allow two users to achieve mutual exchange and have full access to each other's corresponding access levels. The two users may verify each other before establishing an imaging relationship. The verification may be achieved through access keys, which are managed via a Dynamic Keys Management tool (DKM). Additional details of the access keys and DKM are provided throughout the disclosure.

In some instances, the visiting relationship is an unequal relationship. The visiting relationship may allow other users/nonusers to access/visit the access levels with visitable contents of a first user. However, the access levels with contents that are not made visitable by the first user may not be accessed/visited by other users/nonusers who are in a visiting relationship with the first user. The first user may require verification of other users/nonusers before establishing the visiting relationship. The verification may be achieved through access keys, which are managed via a Dynamic Keys Management tool (DKM). Additional details of the access keys and DKM are provided throughout the disclosure.

In some instances, the subscribing relationship is an unequal relationship. The subscribing relationship may allow other users/nonusers to access/subscribe the access levels with subscribable contents of a first user. However, the access levels with contents that are not made subscribable by the first user may not be accessed/subscribed by other users/nonusers who are in a subscribing relationship with the first user. The first user may not require verification of the subscriber before establishing the subscribing relationship such that everyone who wants to subscribe the first user's subscribable contents can subscribe such contents. The first user may push contents through the subscribable access levels, and the subscribers may receive the contents. As such, the user may control other's accessibility to different access levels. The techniques and systems described herein may be implemented in a number of ways. Example implementations are provided below with reference to the following figures.

FIG. 1A illustrates a system 100 comprising a relationships management system 102.

Referring to FIG. 1A, the system 100 may include a computing device 104 which runs or provides access to the relationships management system 102. The relationships management system 102 may include a user profile 102a. The user profile 102a may be associated with one or more access levels, including, for example, Friends 102b, Clients 102c, Family 102d, Co-Workers 102e, Neighbors 102f, Classmates 102g, Church Members 102h, Strangers 102i. Each of the access levels may represent a type of relationship in human society. The attributes of the access level may be defined by the user. The relationships management system 102 may include a user interface 102j. A user may interact with the relationships management system 102 via the user interface 102j.

The system 100 may further include network 106. In some instances, the network 106 may represent one or more wired or wireless networks, such as the Internet, a Mobile Telephone Network (MTN), or other various communication technologies. In some instances, the network 106 may include any WAN or LAN communicating via one or more wireless protocols including but not limited to RFID, near-field communications, optical (IR) communication, Bluetooth, Bluetooth low energy, ZigBee, Z-Wave, Thread, LTE, LTE-Advanced, WiFi, WiFi-Direct, LoRa, Homeplug, MoCA, Ethernet, etc.

The system 100 may further include one or more server(s) 108. The computing device 104 may communicate with the one or more server(s) 108 with the network 106. The one or more server(s) 108 may store data 110 associated with the relationships management system 102. In some instances, data 110 may be stored in an architecture as follows. Data 110 may include data 110a associated with the user profile 102a. Data 110a may include data 110b, 110c, and 110d associated with different access levels. For example, the data 110b may be associated with the access level of Friends 102b, and the data 110d may be associated with the access level of Family 102d. As an example, the data 110b associated with the access level of Friends 102b may include first picture data 110e, and the data 110d associated with the access level of Family 102d may include second picture data 110f. A key/token 110g may indicate that the access level of Friends 102b has the authority to access the data associated with the access level of Family 102d, and/or the access level of Family 102d has the authority to access the data associated with the access level of Family 102d. In that case, the access level of Family 102d may access the first picture data 110e, and/or the access level of Friends 102b may access the second picture data 110f. Moreover, the first picture data 110e and the second picture data 110f may be stored in an integrated way to minimize duplication and save storage space. Furthermore, efficient data access between different access levels may be achieved. Additional details of the relationships management platform are given throughout this disclosure.

Figure 1B:
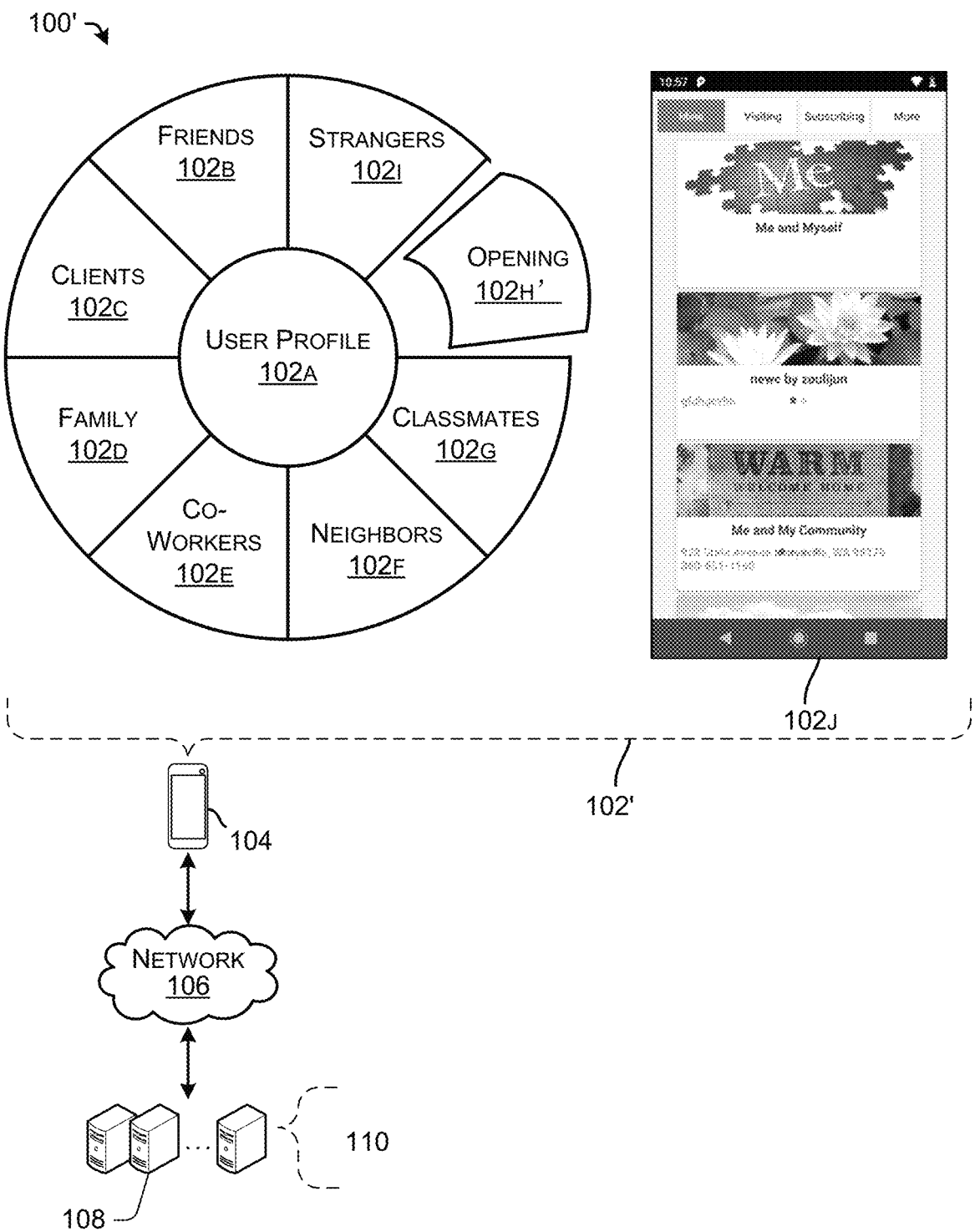
FIG. 1B illustrates another system comprising a relationships management system.

FIG. 1B illustrates another system 100' comprising a relationships management system 102'.

In FIG. 1B, the same reference number refers to the same element as in FIG. 1A. Referring to FIG. 1B, the system 100' may include a computing device 104 which runs or provides access to the relationships management system 102'. The relationships management system 100' may include a user profile 102a. The user profile 102a may be associated with one or more access levels, including, for example, Friends 102b, Clients 102c, Family 102d, Co-Workers 102e, Neighbors 102f, Classmates 102g, Opening 102h', and Strangers 102i.

Each of the access levels may represent a type of relationship in human society. The attributes of the access level may be defined by the user. The relationships management system 102' may include a user interface 102j. A user may interact with the relationships management system 102' via the user interface 102j.

In some instances, the user may adjust/customize each of the access levels along a timeline. Since the social relationships of the user may change as time passes, the user may want to add, delete, and change the access levels to reflect such social relationship changes along the timeline. For example, the access level of Opening 102h' may be an access level that the user to add and/or customize. The relationships management system 102h' may provide a bank of access level templates for the user to select and customize (more details are described with regard to I-Rapport). For example, the user may not be a church member at first and joins a church later on. Then, the user may build an access level of Church Members at the access level of Opening 102h'. The user may select a template provided by the relationships management system 102' or may build up his/her own, so as to manage relationships with other church members. As another example, the user may not have kids at one time and then have several children years later. In that case, the user may add an access level of School at the access level of Opening 102h' to manage the relationships with other school children, parents, teachers and the like.

The system 100' may further include network 106 and one or more server(s) 108 which may store data 110. The functions of the network 106 and one or more server(s) 108, and the architecture of the data 110 are the same as described above with reference to FIG. 1A, and the details are not repeated here.

Figure 1C:
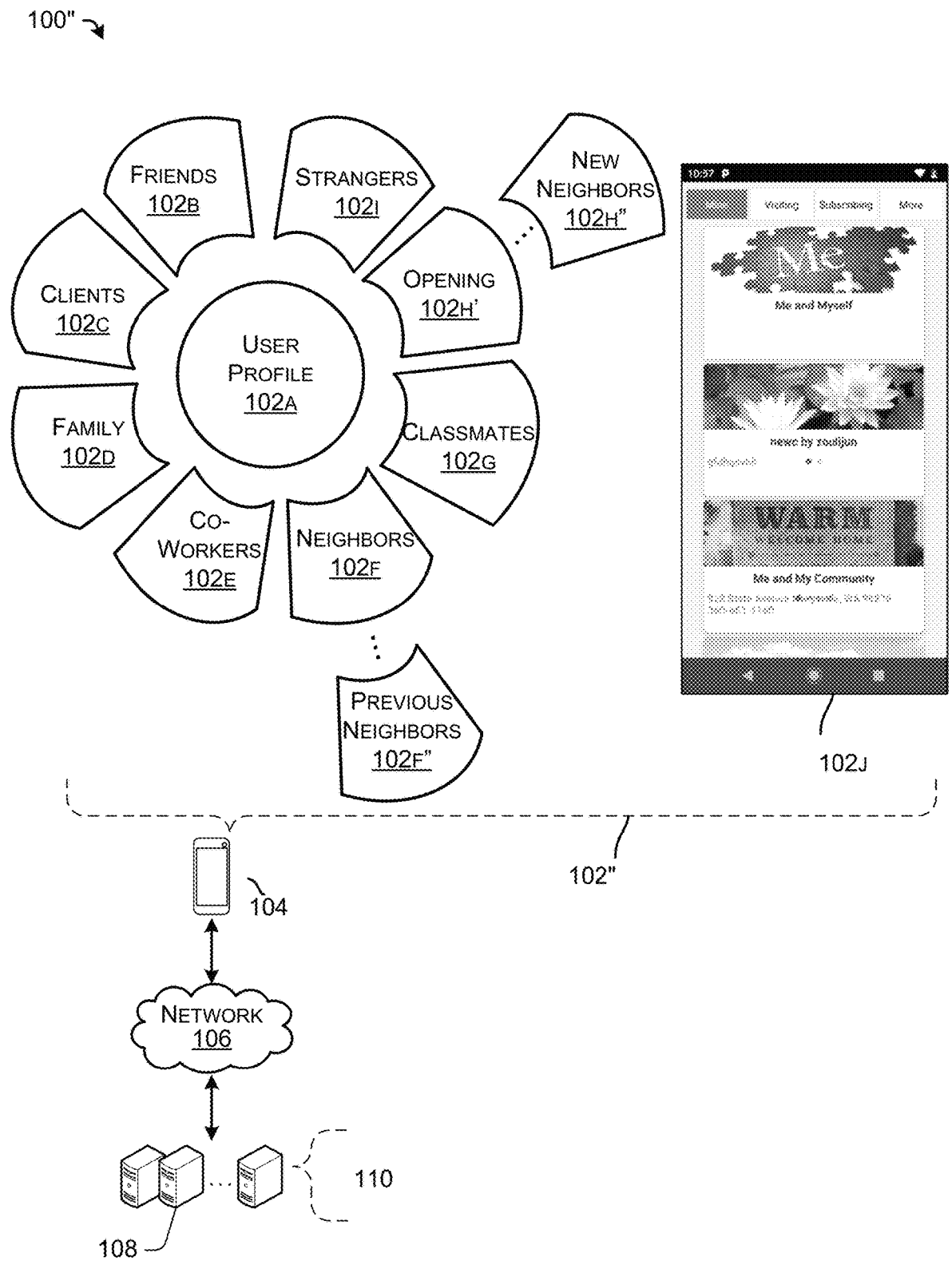
FIG. 1C illustrates another system comprising a relationships management system.

FIG. 1C illustrates another system 100" comprising a relationships management system 102".

In FIG. 1C, the same reference number refers to the same element as in FIG. 1A and FIG. 1B. Referring to FIG. 1C, the system 100" may include a computing device 104 which runs or provides access to the relationships management system 102". The relationships management system 102" may include a user profile 102a. The user profile 102a may be associated with one or more access levels, including, for example, Friends 102b, Clients 102c, Family 102d, Co-Workers 102e, Neighbors 102f, Classmates 102g, Opening 102h', and Strangers 102i.

Each of the access levels may represent a type of relationship in human society. The attributes of the access level may be defined by the user. The relationships management system 102" may include a user interface 102j. A user may interact with the relationships management system 102" via the user interface 102j.

In some instances, the user may adjust/customize each of the access levels along a timeline. Since the social relationships of the user may change as time passes, the user may want to add, delete, and change the access levels to reflect such social relationship changes along the timeline. For example, the user may move from one place to another. In that case, the access level of Neighbors 102f may be adjusted by the user to be previous neighbors 102f'. The user may change the access level of Opening 102h' to be an access lever of New neighbors 102h". As another example, the user may delete the access level of Neighbors 102f if the user does not want to contact the members in the access level of Neighbors 102f anymore. The user may adjust/customize other access levels similarly. As such, the user can manage the relationships by adjusting/customizing the access levels in a timely manner. In other words, the evolution of the access levels may reflect the changing of social relationships of the user along the timeline.

The system 100" may further include network 106 and one or more server(s) 108 which may store data 110. The functions of the network 106 and one or more server(s) 108, and the architecture of the data 110 are the same as described above with reference to FIG. 1A, and the details are not repeated here.

In some examples, once a group of access levels has been established using the relationships management system, the ownership of the group of access levels belongs to the user, but not the provider of the relationships management system. In other words, the user will build up and own the cyber-image of his/her social connections by a set of tools provided by the relationships management system. In some cases, the provider of the relationships management system does not have the right or power to delete, block, or disable the group of access levels of the user profile. In some examples, the user is the dominant owner of his/her access levels. Even in the case of a cancellation or deletion of a user's access level by whatever reason, the access level representing a social connection can be retrieved or rebuilt by contribution of other users who are in the same social connection (Imaged, visited and subscribed).

FIGS. 2A-2I illustrate pictorial flow diagrams of a process 200 for managing relationships via a relationships management system. FIGS. 2A-2I illustrate high-level pictorial flow diagrams, and additional details of the implementation are given throughout this disclosure.

Figure 2A:
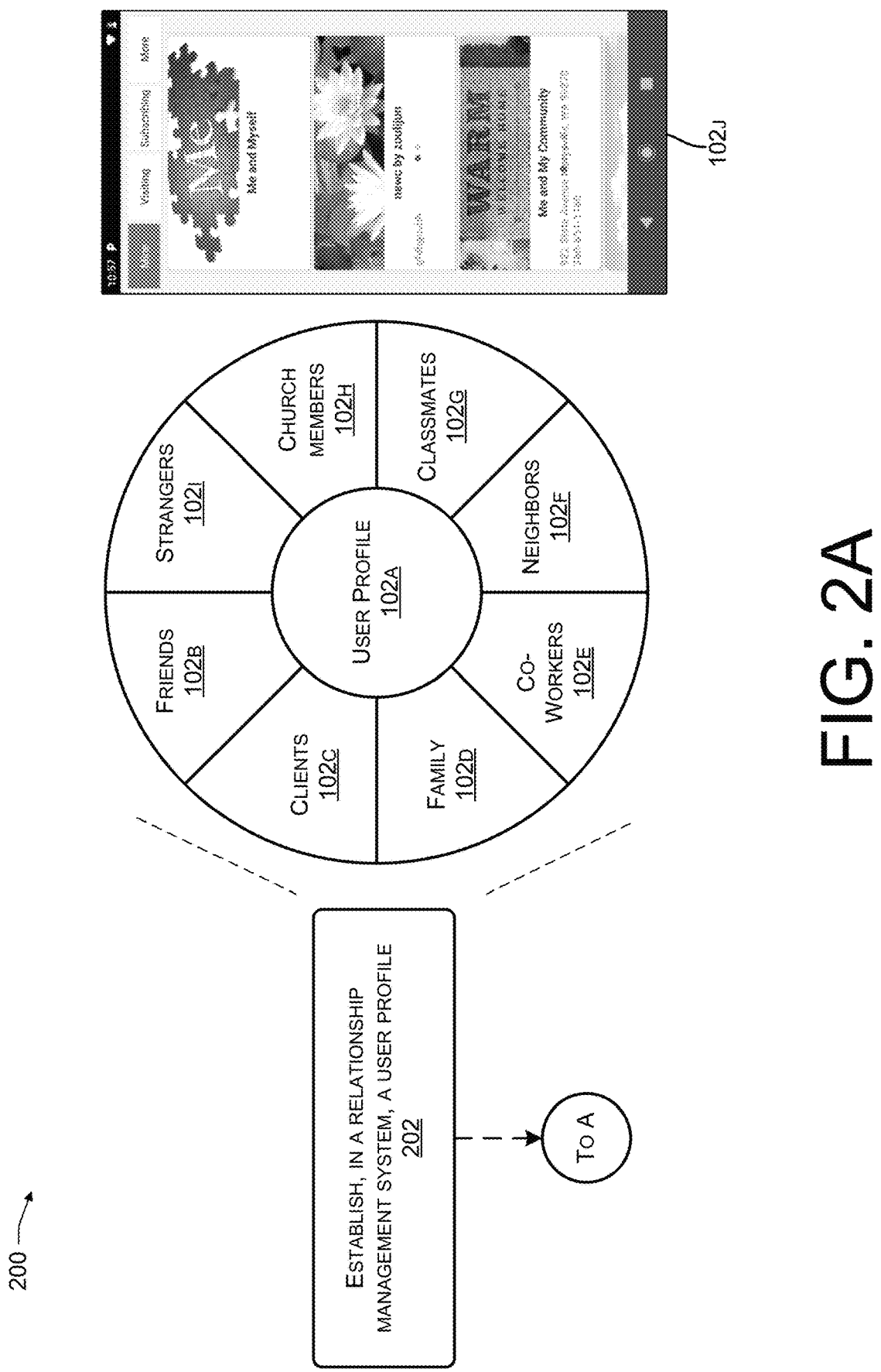

Referring to FIG. 2A, at 202, the operation can include establishing, in a relationships management system, a user profile 102a.

For example, a user may build up a user profile 102a on the relationships management system. The user profile 102a may be associated with a plurality of access levels. Each of the access levels may represent a type of relationship in human society. The attributes of the access level may be defined by the user. For example, the access level of "Friends 102b" is an access level representing the relationship of being friends with the user; the access level of "Clients 102c" is an access level representing the relationship of being clients to the user; the access level of "Family 102d" is an access level representing the relationship of being family members with the user; the access level of "Co-workers 102e" is an access level representing the relationship of being co-workers/colleagues with the user; the access level of "Neighbors 102f" is an access level representing the relationship of being neighbors with the user; the access level of "Classmates 102g" is an access level representing the relationship of being classmates with the user; the access level of "Church members 102h" is an access level representing the relationship of being church members with the user; and the access level of "strangers 102i" is an access level representing the relationship of being strangers with the user. The above access levels are used for illustration, and this disclosure is not limited thereto. Other relationships in human society may also be represented by other access levels.

Each of the access levels may provide a plurality of functions. The plurality of functions may include common functions and special functions. A function may include one or more user-enabled applications. Common functions may include a contacts application, a dialogue application, a post application, a library application, a calendar application etc. Special functions may include one or more customizable applications such as an advertising application, a billing application, a book-keeping application, an accounting application, Customer Relationships management (CRM), etc. The Special functions may be customized/adjusted for different access levels. The above functions/applications are listed for illustration purposes, and this disclosure is not limited thereto. The common functions and the special functions may be implemented via an information flow management tool (InFlux). InFlux may integrate information sources, instant messaging, broadcasting, information query and storage, information synchronization and other functions for special processing of information flows into the relationships management system with controllable and manageable information flow boundaries. InFlux may classify the functions/applications based on various social relationships. InFlux may reflect a substantially complete set of human information flow by adjusting and improving the functions/applications. Additional details of InFlux are described throughout this disclosure.

As an example, a first access level "Friends 102b" may include common functions such as a first contacts application, a first dialogue application, a first post application, a first library application, and a first calendar application. The first contacts application may be configured to manage the contacts. The first dialogue application may be configured to enable the user to conduct live chat with one or more other people, in a one-to-one, one-to-many, many-to-one, or many-to-many manner. The first post application may be configured to enable the user to post/broadcast information. The user may also repost information/contents via the first post application. For example, when the user reposts another user's article, the entire article may be copied and reprinted. As such, even if the original article was deleted, the reprinted article can still be there, and the freedom of speech can be protected. Alternatively, or additionally, when the user reposts another user's article, a link directed to the original article may be posed. In such a way, storage space and online traffic may be saved. The first library application may be configured to enable the user to store/archive information. The first calendar application may be configured to enable the user to manage schedules, events, activities, etc. Further, the first access level "Friends 102b" may include special functions which includes one or more customizable applications such as such as a book club application that is configured to manage activities in a book club, a workout application that is configured to help the user in workout activities, etc. The Special functions may be customized/adjusted based on actual needs.

As another example, a second access level "Family 102d" may include common functions such as a second contacts application, a second dialogue application, a second post application, a second library application, and a second calendar application. The second contacts application may be configured to manage the contacts. The second dialogue application may be configured to enable the user to conduct live chat with one or more other people, in a one-to-one, one-to-many, many-to-one, or many-to-many manner. The second post application may be configured to enable the user to post/broadcast information. The user may also repost information/contents via the second post application. For example, when the user reposts another user's article, the entire article may be copied and reprinted. As such, even if the original article was deleted, the reprinted article can still be there, and the freedom of speech can be protected. Alternatively, or additionally, when the user reposts another user's article, a link may be posed, which is directed to the original article. In such a way, storage space and online traffic may be saved. The second library application may be configured to enable the user to store/archive information. The second calendar application may be configured to enable the user to manage schedules, events, activities, etc. Further, the second access level "Family 102d" may include special functions such as a meeting application which is configured to manage meetings, a game application which is configured to enable the user to play games individually or with other users, etc. The Special functions may be customized/adjusted based on actual needs.

The above access levels and functions/applications are described for the purpose of illustration, and this disclosure is not limited thereto. Other access levels and functions/applications may present.

For example, an access level of small-medium entrepreneur (SME) business running/grouped administration may include the following functions: customer relationships management (CRM), sale, ordering, accounting, online store, invoice/bill, scheduling, service record, etc. All kinds of business affairs can be merged into a social relationship.

For example, an access level of online school may include the following functions: a class management application, an assignment application, a grade/score application, a discussion/forum application, a learning center application, etc.

For example, an access level of property management may include the following functions: resident management, notification, billboard, homeowner association (HOA) meeting, library, vote, maintaining, dues/payments, etc.

For example, an access level of church membership may include the following functions: membership management, events, library, learning center, etc.

For example, an access level of neighbors and community may include the following functions: member, event, share, help, discuss, etc.

For example, an access level of business management may include the following functions: contacts, communications, broadcasting, advertising, billing and book-keeping, accounting, CRM, etc.

For example, an access level of knowledge and mindset may include the following functions: questions and answers (Q&A), an expert at door, knowledge, etc.

In some instances, each of the access levels may be defined based at least in part on data input via a user interface 102j. For example, the relationships management system may include a user interface for the user to interact with the relationships management system. The user may input data/instructions via the user interface to define attributes of the access level.

As discussed above, each of the access levels may include a plurality of common functions plus special functions. As an example, a first access level "Friends 102b" may include a first plurality of common functions, such as a first contacts application, a first dialogue application, a first post application, a first library application, and a first calendar application. The first access level "Friends 102b" may further include special functions that are customizable based on actual needs. A second access level "Family 102d" may include a second plurality of common functions such as a second contacts application, a second dialogue application, a second post application, a second library application, and a second calendar application. The second access level "Family 102d" may further include special functions that are customizable based on actual needs. In such a way, various access levels may be configured to reflect different kinds of social relationships. Different functions/applications may be implemented by InFlux and I-Rapport. InFlux is an information flow management tool, which is configured to manage information flows of various access levels. I-Rapport is a relationship building tool, which is configured to build up connections/relationship among people. For example, InFlux and I-Rapport may be used to copy/hide channel/content of an access level. Additional details of the InFlux and I-Rapport are given throughout this disclosure.

In some instances, a data entry associated with the first plurality of functions may be associated with the second plurality of functions based at least in part on a data access token. The data access token may indicate the data access authority of a function to the data stored in the memory/storage in a computing device or an online database. The token may be a flag bit, an identifier, a header, or other data that can indicate the data access authority. For example, the user stores a picture via the first post application associated with the first access level "Friends 102b". The picture may be also accessed by the second post application associated with the second access level "Family 102d" based at least in part on the data access token. Likewise, functions associated with one access level may also assess data stored by other functions associated with other access levels based at least in part on the data access token. In this way, the data volume may be reduced, and data duplication may be reduced.

In other words, the relationships management system may provide a comprehensive solution including relationship definition and activities management. For example, the relationship definition can be configured via I-Rapport, which is a relationship building tool configured to build up connections/relationship among people. The activities management can be implemented via InFlux, which is an information flow management tool configured to manage information flows of various access levels. The user may find out not only efficiency and low cost on business running, but also the convenience of relationships management in an easy social-like scenario, a gap-free communication with a group of people who are connected by the common interest. At the same or similar time, the user can use different customized access levels to image and manage multiple aspects of his/her life. As a result, the relationships management system may image the user's life by putting a series of access levels representing each persona of the user's life together and provide an approach of relationships management.

Referring to FIG. 2B, the process 200 may further include the following operations.

At 204, the operation can include receiving a privacy control instruction via the user interface. In some instances, the user may control the privacy status of the content of the information flow of each access level. For example, the user may post a picture in a first user profile level. The user may input/select a privacy control instruction via the user interface to set the post as accessible/inaccessible to one or more people or the public. The user may also input/select a privacy control instruction via the user interface to set whether others could comment on the post. For example, the user may input/select a privacy control instruction via the user interface to set his/her profile as searchable/unsearchable to the public. The privacy control instruction may be used to control the expansion of information and/or the spread of information across different access levels. The operation of receiving the privacy control instruction via the user interface may be implemented via the information flow management tool InFlux.

In some instances, a sub-organization management tag may be used to indicate the privacy status of the access level. For example, the information/content of the access level may be marked with the sub-organization management tag as can/cannot be received, quoted, copied, referred to, and/or forwarded based on the input by the user. As such, the user has the privacy control over the content/information flow of each access level. The privacy is under control.

Moreover, the content body/information flow of an access level can be spread across different access levels, with the help of InFlux. For example, when the user shares an article in a first access level to a second access level, InFlux may copy the article from the first access level and reprint the article in the second access level. As such, even if the original article was deleted, the reprinted article is still there. Alternatively or additionally, when the user shares an article in a first access level to a second access level, InFlux may just post a link in the second access level that is directed to the original article in the first access level. In such a way, storage space and online traffic may be saved.

At 206, the operation can include setting a privacy status of the first access level at least partially in response to receiving the privacy control instruction. For example, the relationships management system may set the privacy status of a picture posted by the user in the first access level as accessible/inaccessible to one or more people or the public in response to receiving the privacy control instruction. For example, the relationships management system may set whether others could comment on the post in response to receiving the privacy control instruction. For example, the relationships management system may set the user profile as searchable/unsearchable to the public in response to receiving the privacy control instruction. The operation of setting the privacy status of the first access level at least partially in response to receiving the privacy control instruction may be implemented via the information flow management tool InFlux.

Figure 2C:
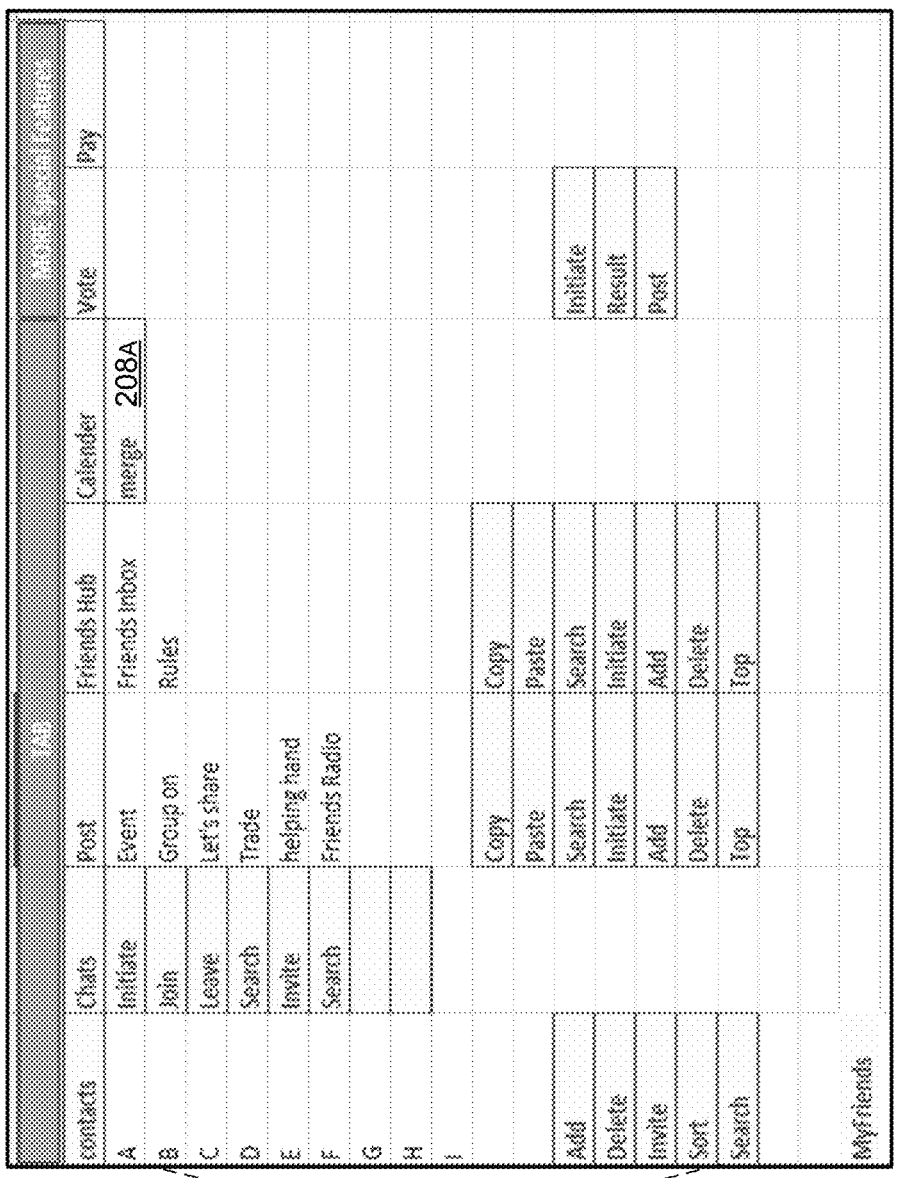
Figure 2C:
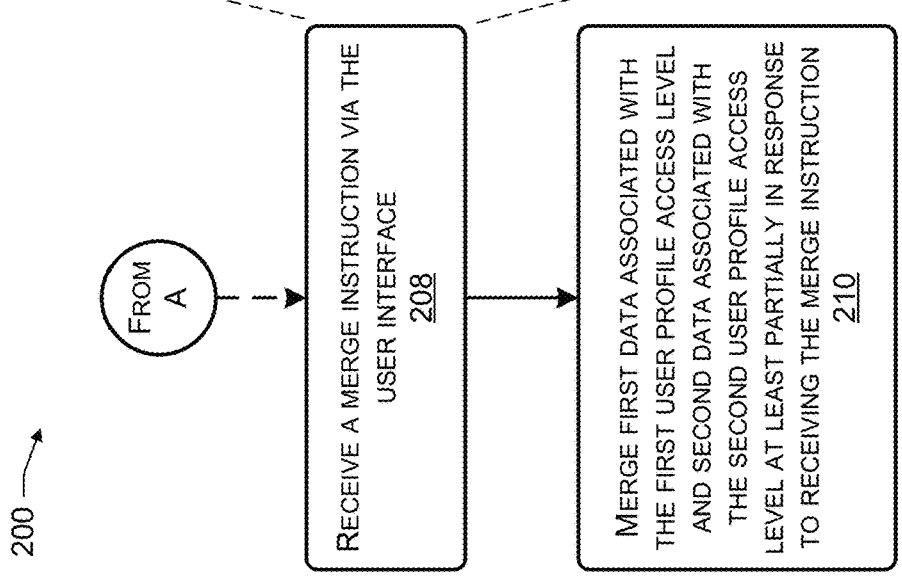

Referring to FIG. 2C, the process 200 may further include the following operations.

At 208, the operation can include receiving a merge instruction via the user interface. In some instances, the user may merge the data/content associated with different access levels. For example, the user may input/select a merge instruction via the user interface to merge the data in the first post application associated with the first access level and the data in the second post application associated with the second access level. For another example, the user may input/select a merge instruction 208a via the user interface to merge the data in the first calendar application associated with the first access level and the data in the second calendar application associated with the second access level. The operation of receiving the merge instruction via the user interface may be implemented via the information flow management tool InFlux.

At 210, the operation can include merging first data associated with the first access level and second data associated with the second access level at least partially in response to receiving the merge instruction. The operation of merging first data associated with the first access level and second data associated with the second access level at least partially in response to receiving the merge instruction may be implemented via the information flow management tool InFlux.

The above merging examples are for the purpose of illustration, and this disclosure is not limited thereto. Other contents/information flows associated with different access levels may also be merged.

Referring to FIG. 2D, the process 200 may further include the following operations.

At 212, the operation can include receiving an information flow sharing instruction via the user interface. In some instances, the user may share information flow associated with different access levels. The information flow may include posts, chat history, the information in a library, the information in a calendar, etc. For example, the user may input/select an information flow sharing instruction via the user interface to share an information flow associated with the first access level with the second access level. The operation of receiving the information flow sharing instruction may be implemented via the user interface InFlux.

At 214, the operation can include sharing an information flow across the first access level and the second access level at least partially in response to receiving the information flow sharing instruction. The operation of sharing an information flow across the first access level and the second access level at least partially in response to receiving the information flow sharing instruction may be implemented via the user interface InFlux.

In some instances, the content body/information flow can be shared across different access levels, with the help of InFlux. For example, when the user shares an article in the first access level to the second access level, InFlux may copy the article from the first access level and reprint the article in the second access level. As such, even if the original article was deleted, the reprinted article is still there. Alternatively or additionally, when the user shares an article in a first access level to a second access level, InFlux may just post a link in the second access level that is directed to the original article in the first access level. In such a way, storage space and online traffic may be saved.

Figure 2E:
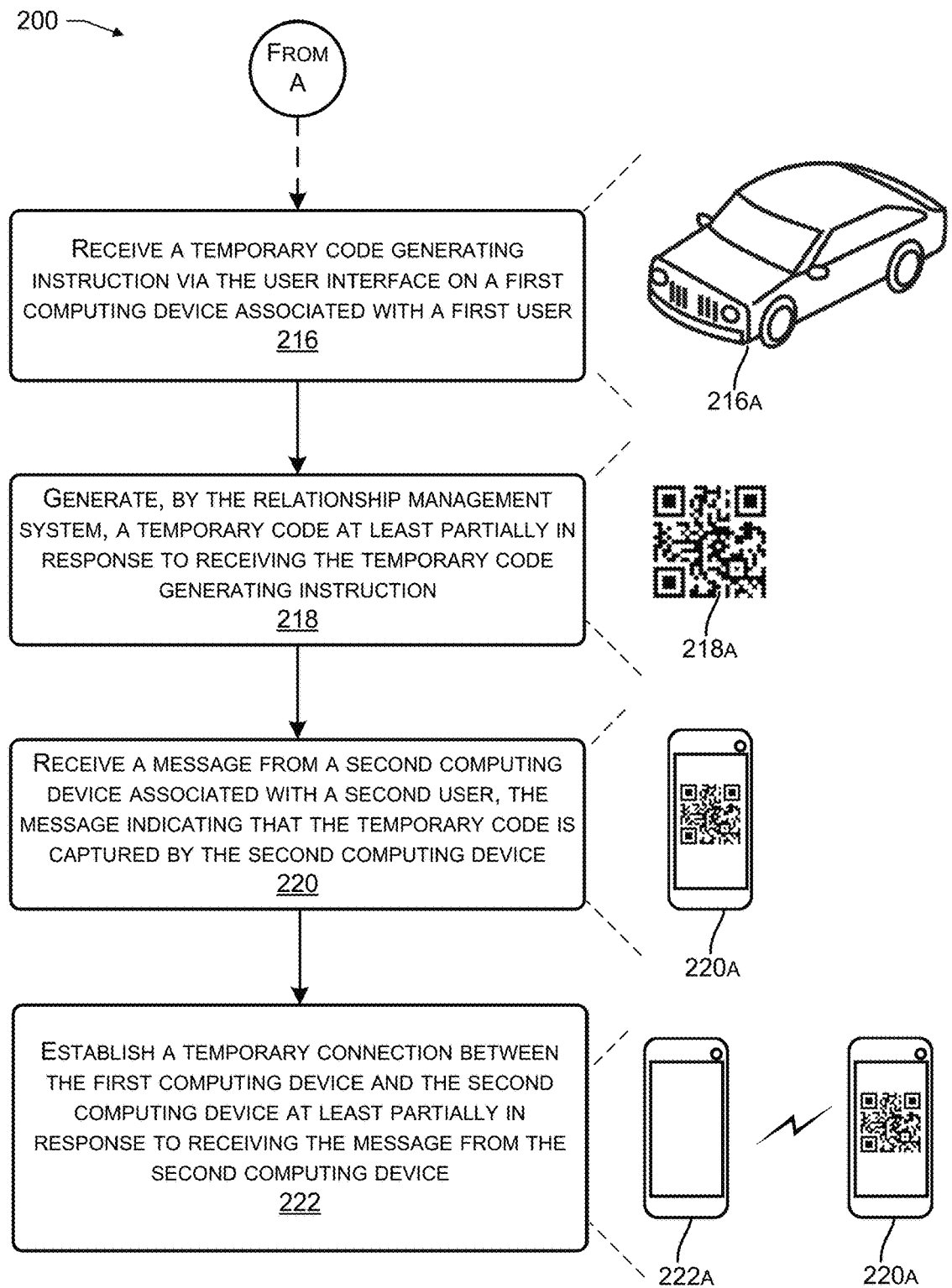

Referring to FIG. 2E, the process 200 may further include the following operations.

At 216, the operation can include receiving a temporary code generating instruction via the user interface on a first computing device associated with a first user. In some instances, the first user may want to establish a temporary connection with a second user who may be a stranger. The temporary code may indicate temporary contact information of the first user and may be one-time effective or expire in a certain amount of time. In terms of structure, the temporary code is a temporary Key. In such cases, the first user may input/select a temporary code generating instruction via the user interface on a first computing device. For example, the first user parks his/her car 216*a* on the roadside. However, the first user does not want to block other's way and may want other people to contact him/her if his/her car block other's way. Meanwhile, the first user may want to protect his/her privacy and not want to make his/her phone number public.

At 218, the operation can include generating, by the relationships management system, a temporary code at least partially in response to receiving the temporary code generating instruction. A temporary relationship can be established via an access level of the relationships management system, just like two persons shaking hands with mittens, such that the privacy of each person can be protected. In some instances, the temporary code may be a bar code, a quick response (QR) code, a serial number, or other data or identifier(s) that can indicate contact information. For example, the first user may put the temporary code 218*a* on the windshield (or anywhere visible to the outside) of his/her car for other people to contact him/her.

At 220, the operation can include receiving a message from a second computing device associated with a second user. The message may indicate that the temporary code is captured by the second computing device 220*a*. In some instances, the second user may capture the temporary code with the second computing device 220*a*. For example, the first user's car may block the way of the second user. The second user may use the second computing device 220*a* to scan the temporary code 224*a* on the windscreen of the first user's car 216*a* to obtain the temporary contact information of the first user. The second computing device 220*a* may send a message to the relationships management system, indicating that the temporary code 224*a* is captured by the second computing device.

At 222, the operation can include establishing a temporary connection between the first computing device 222*a* and the second computing device 220*a* at least partially in response to receiving the message from the second computing device. In some instances, the temporary connection may include a phone call, a text chat, an audio call, a video call, a voice message, etc. The first user and the second user may not wish to contact each other after the temporary connection, and the temporary connection may be one-time effective. As such, a convenient temporary connection can be established between the first user and a stranger, while the first user does not need to expose his/her private information.

Figure 2F:
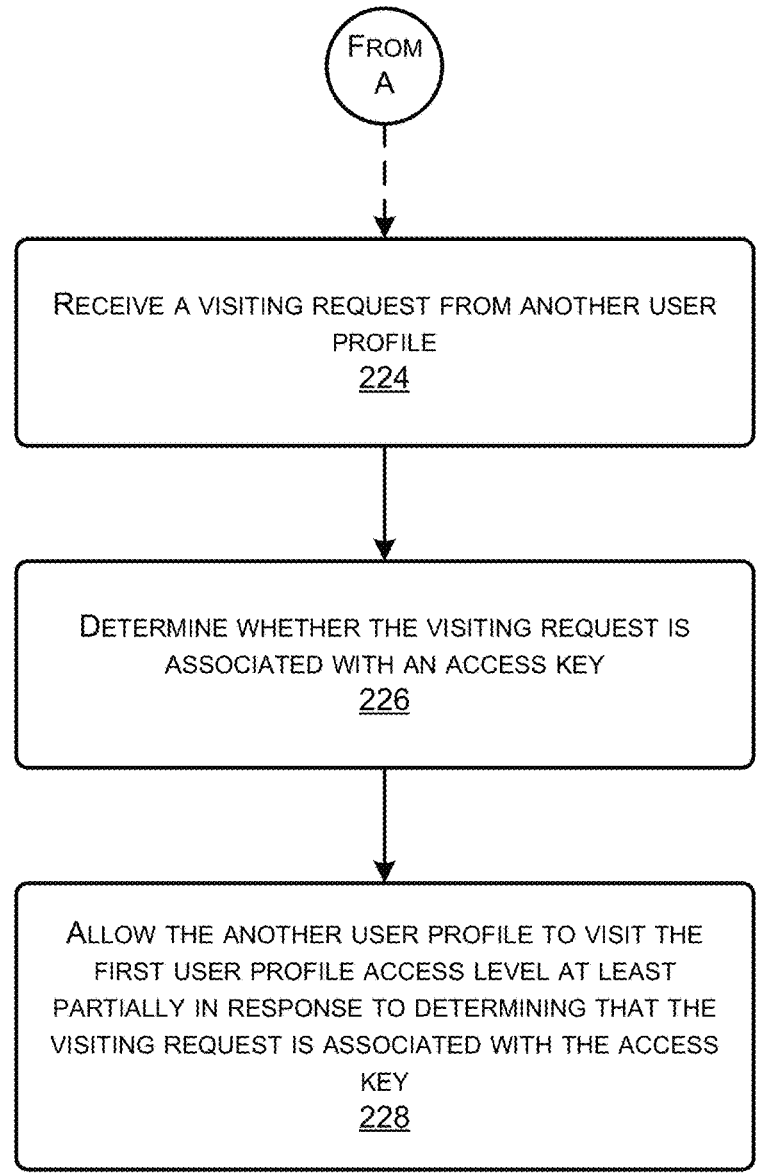

Referring to FIG. 2F, the process 200 may further include the following operations.

At 224, the operation can include receiving a visiting request from another user profile. The visiting request may request to visit the first access level. In some instances, a second user may want to visit an access level (for example, "neighbors") associated with a first user profile. The second user may send the visiting request to the first user.

At 226, the operation can include determining whether the visiting request is associated with an access key. In some instances, the information flow/content in the access level (for example, "neighbors") associated with the first user profile may be visited by other users or the public. The first user may define whether the access level can be visited, for example, based on the access key. The access key may be configured in the form of a visiting key, which is managed via the Dynamic Keys Management tool (DKM). Additional details of the keys and DKM are described throughout this disclosure.

At 228, the operation can include allowing another user profile to visit the first access level at least partially in response to determining that the visiting request is associated with the access key.

Figure 2G:
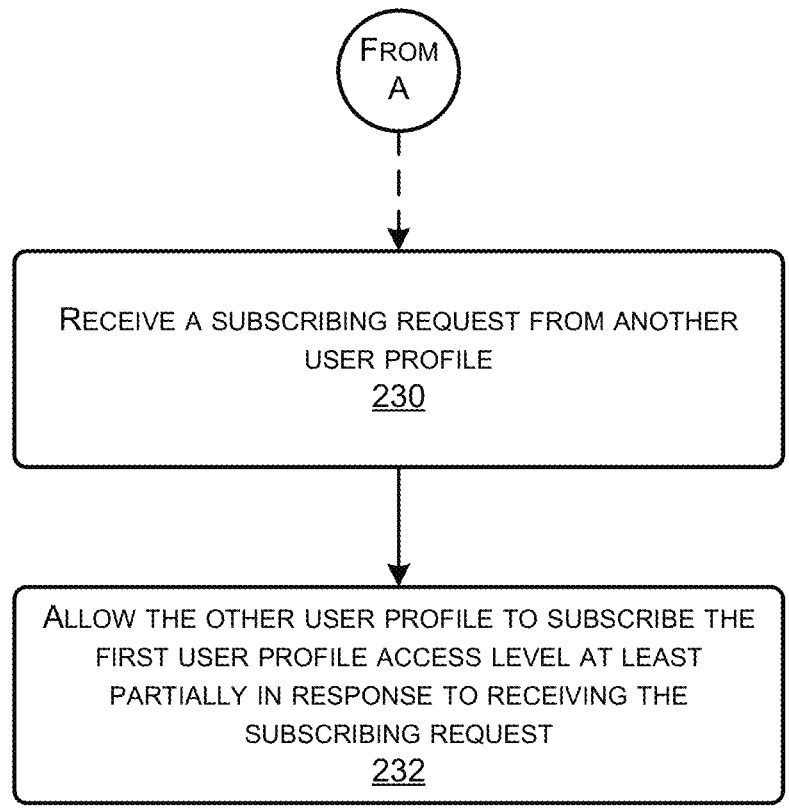

Referring to FIG. 2G, the process 200 may further include the following operations.

At 230, the operation can include receiving a subscribing request from another user profile. The subscribing request may request to subscribe to the first access level. In some instances, a second user may want to subscribe to an access level (for example, an access level of "my billboard") associated with a first user profile. The second user may send the subscribing request to the first user.

In some instances, the subscribing request may include a subscribing key. The subscribing key associated with the second user may be configured for the situation where there is no need for approval/verification, i.e., the second user (the subscriber) may have the subscribing key validated and activated immediately when the first user (the owner of the first access level) receives the subscribing key. The subscribing key may be managed via the Dynamic Keys Management tool (DKM). Additional details of the subscribing key and DKM are provided throughout the disclosure.

At 232, the operation can include allowing the other user profile to subscribe to the first access level at least partially in response to receiving the subscribing request. In some instances, the information flow/content in the access level (for example, the access level of "my billboard") associated with the first user profile may be subscribed by other users or the public. The first user may define whether the access level can be subscribed.

The difference between subscribing and visiting may be that, visiting needs to be acknowledged by the first user, while subscribing may be allowed without verification.

As described throughout the disclosure, the type of the key may be represented by Boolean operators, such as IUI, IU0, 0UI, 0U0, and the like. IUI may stand for access level created/imaged by the user and may indicate an imaged key type. IU0 may represent access to a visiting access level and may indicate a visiting key type. 0UI may represent access to a subscribing access level and may indicate a subscribing key type. 0U0 may represent invalid access and indicate an invalid key type. All the IU0 and 0UI access levels have to be based on one and only one IUI access level at a time.

Figure 2H:
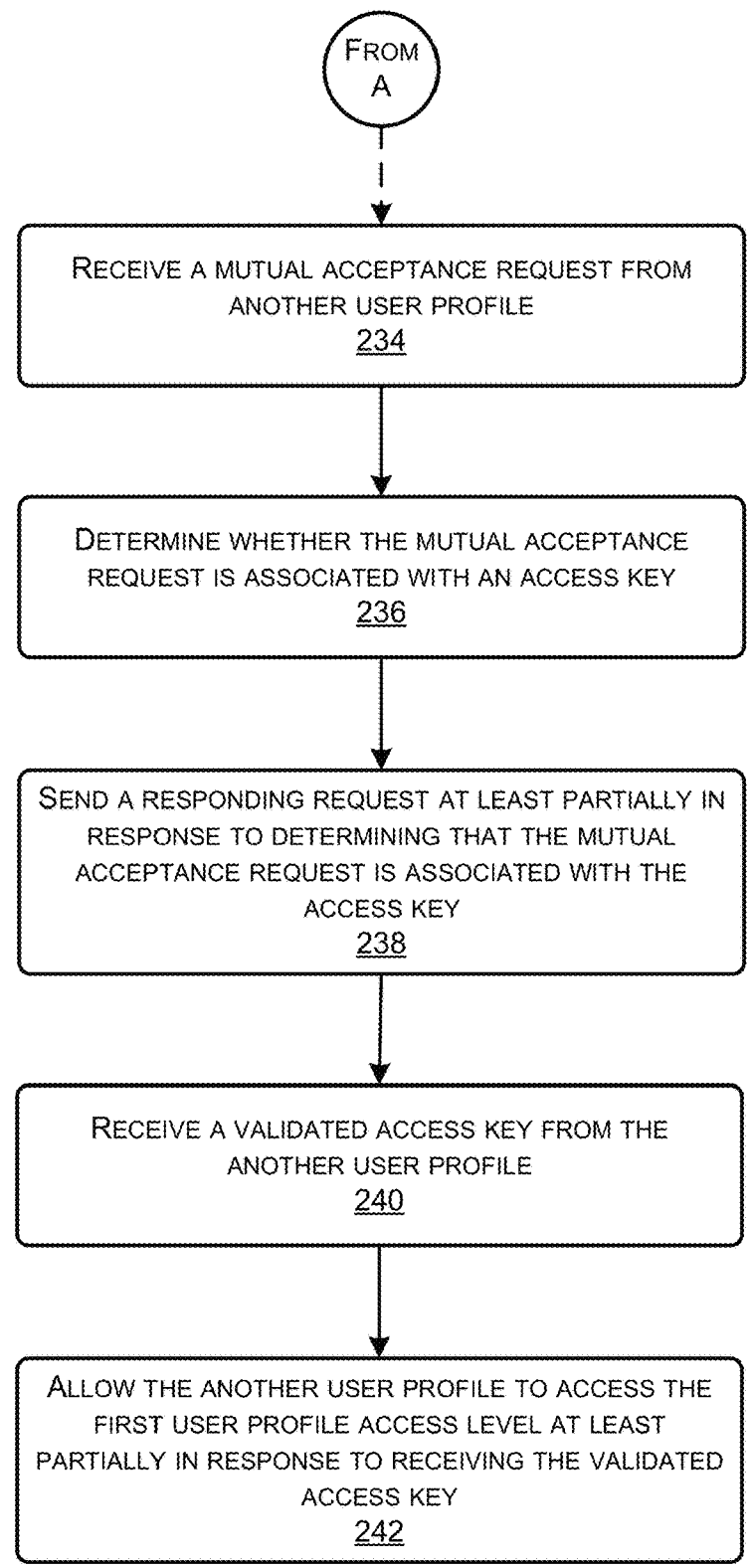

Referring to FIG. 2H, the process 200 may further include the following operations.

At 234, the operation can include receiving a mutual acceptance request from another user profile. The mutual acceptance request may request access to the first access level. In some instances, a second user may want to establish mutual acceptance in an access level (for example, an access level of "friends") associated with a first user profile. The second user may send the mutual acceptance request to the first user.

At 236, the operation can include determining whether the mutual acceptance request is associated with an access key. The access key may be configured in the form of an imaged key, which is managed via the Dynamic Keys Management tool (DKM). Additional details of the imaged key and DKM are described throughout this disclosure.

At 238, the operation can include sending a responding request at least partially in response to determining that the mutual acceptance request is associated with the access key. The responding request may request access to a corresponding access level associated with another user profile.

At 240, the operation can include receiving a validated access key from another user profile.

At 242, the operation can include allowing another user profile to access the first access level at least partially in response to receiving the validated access key.

As described throughout the disclosure, the type of the key may be represented by Boolean operators, such as IUI, IU0, 0UI, 0U0, and the like. IUI may represent access to an imaged access level (i.e., the mutual acceptance access level) and may indicate an imaged key type. IU0 may represent access to a visiting access level and may indicate a visiting key type. 0UI may represent access to a subscribing access level, and may indicate a subscribing key type. 0U0 may represent invalid access and indicate an invalid key type.

In some instances, data associated with the first access level and the second access level may be configured to establish an Artificial Intelligence (AI) model. In some instances, data associated with some or all of the access levels associated with the user profile may be configured to establish the AI model.

Human behavior can be reflected by social relationships, and the social relationships can be reflected by various access levels in the relationships management system. The combination of multiple access levels may cover all kinds of social attributes of a person/user, with each access level (each C) represents a social relationship. Multiple access levels are put together to describe the person/user's social relationships. Each access level works like a sensor of one aspect of the social life of the person/user, sensing and quantifying human social behavior, like analog to digital conversion. Relationships, information, and events related to the person/user can be recorded and analyzed. Data can also be added and updated, such that an unlimited lineup of the social behavior data can be recorded along the timeline. This data collection, analysis and application mechanism is carried out by HBA-AI. HBA-AI may establish a model of the social behavior of the person/user based on historical data and create a virtual/digitalized self image of the person/user. In other words, the soul of the person/user can be built/imaged based on his/her historical social behaviors data. For example, the model can be used to answer questions without the person/user's physical participation, but just like the person/user physically involved. Moreover, such a model should be used in a way to benefit the user or the society rather than being used by a third party to achieve specific purposes under covert agenda.

Figure 3:
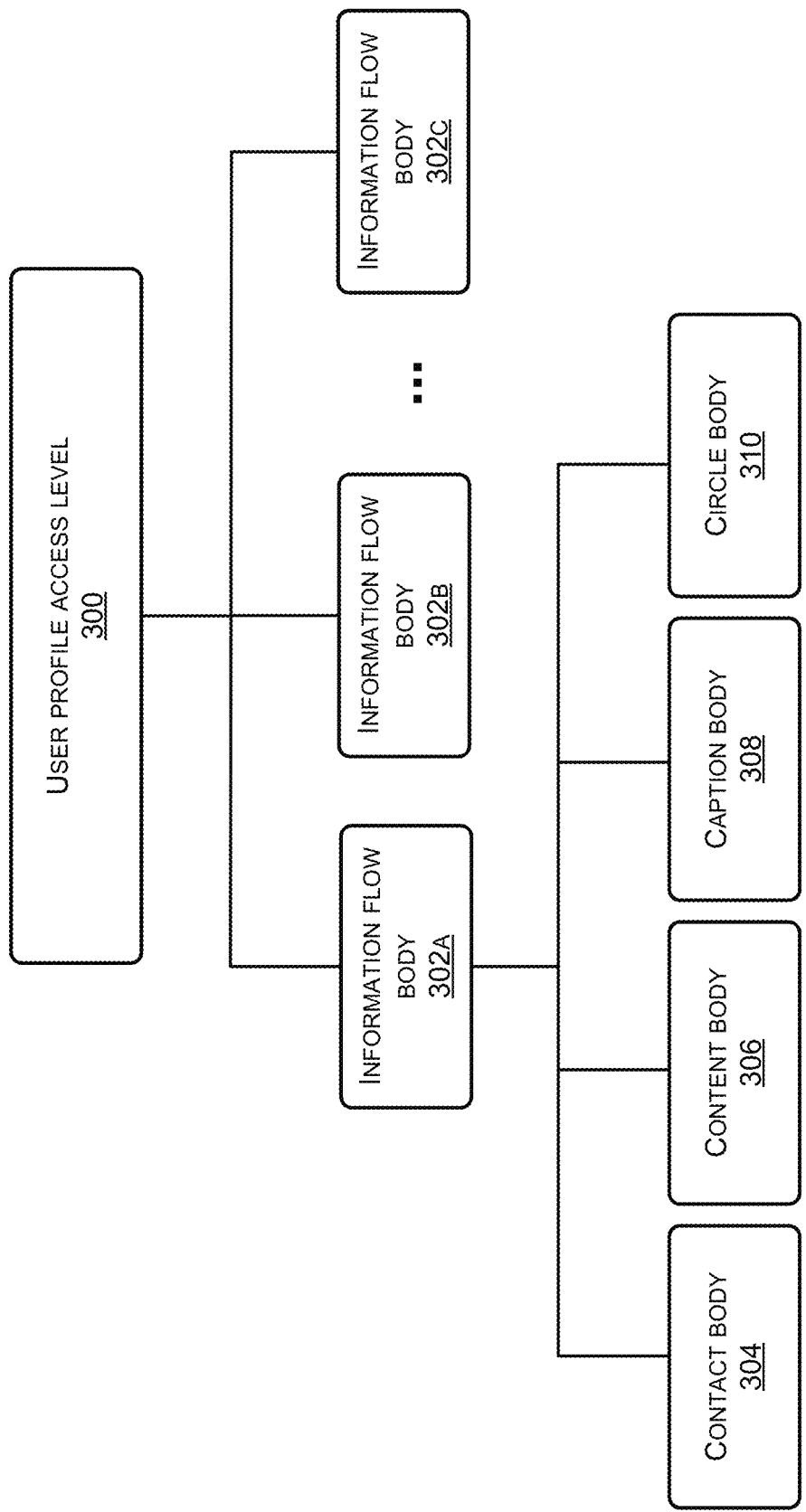
FIG. 3 illustrates a diagram of an example architecture of an access level.

FIG. 3 illustrates a diagram of an example architecture of an access level 300.

The access level 300 may include one or more information flow bodies (C-body) 302a, 302b, . . . , and 302c. Each of the information flow bodies 302a, 302b, . . . , and 302c may be a set of formulated patterns to carry (e.g., store and/or display) information that flows in the access level 300. Each of the information flow bodies 302a, 302b, . . . , and 302c is manageable, displayable, and/or editable. Each of the information flow bodies 302a, 302b, . . . , and 302c may carry information of origin and destination to enable referral. Each of the information flow bodies 302a, 302b, . . . , and 302c may be combined with logic calculations to meet the specific needs of a certain group of users. Each of the information flow bodies 302a, 302b, . . . , and 302c may include a unique ID code, for example, assigned by the relationships management system, which may include, time, name, type, geographic coordinates, etc. All the information flows (e.g., in a form of information flow body) may carry a fraction of one or more relationships, and the key may be the way to describe the fraction which is the caption in all related instances of the information flow bodies.

An exemplary key may be in the form of the following expression (1):

$$X-(YC\text{'s Name})Y1\text{-TK-No.} \qquad (1)$$

In the above expression (1), X may represent the holder of the key, and X may also carry the information of an access level of X and by which X holds the key. In other words, the relationship between X and Y may be through two Cs (two access levels). In a simplified version of a Key, the expression may not show the X's access level.

In the above expression (1), C's name may represent the caption of the access level.

In the above expression (1), Y may represent the creator of the access level.

In the above expression (1), Y1 may represent the imager of C (access level) and the issuer of the key to C (access level).

In the above expression (1), TK may represent a type of the key. The type of the key may be represented by Boolean operators, i.e., IUI, IU0, 0UI, and 0U0. IUI may represent access to an imaged access level, and may indicate an imaged key type. IU0 may represent access to a visiting access level, and may indicate a visiting key type. 0UI may represent access to a subscribing access level, and may indicate a subscribing key type. 0U0 may represent invalid access, and may indicate an invalid key type.

In the above expression (1), No. may represent the sequence number in the access level, i.e., the number of the key issued in order.

In the above expression (1), (Y C's Name) may represent the original access level.

Under the user profile access level 300, each of the information flow bodies 302a, 302b, . . . , and 302c may include sub-categories, such as a contact body 304, a content body 306, a caption body 308, and a circle body 310. Hereinafter, additional details of each of the four sub-categories are described in three perspectives, i.e., structure, content, and approach.

Contact Body 304

The contact body 304 may carry the user's contact information and caption chain by which the key to a certain access level can be derived out. In other words, the contact body 304 may carry not only personal information but also synapsis for connections, i.e., one end of a relationship.

In terms of the structure, the contact body 304 may include a caption section (including name, slogan and pic), an information section (itemized information), a logic calculation unit, and a growth recording unit. The caption section may be configured to carry the captioned information of contacts. The information section may be configured to carry itemized information and general information of contacts. The logic calculation unit may be configured to perform logic calculations, such as toggling on open to the public, tagging, remarking, grouping, etc. The growth recording unit may be configured to record the growth of the relationships management system.

In terms of the content, the caption section may include captioned information, such as codes generated and assigned by the relationships management system, and contents open to the public. The information section may include general information, such as name, alias, tag name, birthday, and other personal information of the contacts. The logic calculation unit may include a result of the logic calculation. The growth recording unit may include recorded growth of the relationships management system.

In terms of the approach, the contact body 304 may be able to be captioned and provide functions such as disclosure control, referring (e.g., suggesting, requesting, inviting, releasing, subscribing), searching, and editing (e.g., by the owner or other user in the same access level), etc.

The caption of contact body 304 may be recorded in the form of a caption body chain (Cap Chain), i.e., a chain of caption body 308. The caption body chain of a contact body 304 may show all the captions in every single access level the contact has. Each caption may represent the information that the contact would like to show in the access level. All the captions may be combined into a chain (e.g., chronologically, by user, by subject, etc.) in a way that reflects the actual multi-relationship in the information flow body 302.

Assuming that AContact is the contact body by name of A, and ContactA is an instance of this type of the contact body, an exemplary contact body may be recorded in the following form of caption body chain: AContactBody {Cap Content LogicCalculation DKM Chain}. [ImagedCircle{CapC1 CapC2 CapC3 CapC4 . . . }+VisitingCircle{CapCi1CapCi2CapCi3 . . . }+SubscribingCircle{CapCj1 CapCj2 CapCj3 . . . }].

Content Body 306

The content body 306 may carry all the content in the access level. This content may be stored in corresponding databases. For example, the content body 306 may carry a post, an essay, a vote, an invitation, a group-on notice, content combined with a logic calculation, etc.

In terms of the structure, the content body 306 may include an information section, a logic calculation unit, a growth recording unit, and a dynamic keys management unit. The information section may be configured to carry contents such as pictures, videos, and texts. The logic calculation unit may be configured to perform logic calculations, such as subscribing, voting, sorting, ordering, donating, greeting, promotion, disbursing, grouping-on, RSVP (Répondez s'il vous plaît), assignment, feedback, billing, bookkeeping, etc. The growth recording unit may be configured to record the growth of the relationships management system. The dynamic keys management unit may be configured to manage dynamic keys.

In terms of the content, the caption of the content body 306 may include captioned information. The information section may include videos, pictures, and texts. The logic calculation unit may include a result of the logic calculations and evolution of the result. The growth recording unit may include recorded growth of the relationships management system. The dynamic keys management unit may include dynamic keys.

In terms of the approach, the content body 306 may be able to provide functions, such as disclosure control (e.g., referring, reposting, broadcasting), information exchange (e.g., Ubering), referring (e.g., suggesting, petition, asking, requesting, solicitation, broadcasting, subscribing, inviting, releasing), searching, and editing (e.g., creating, adding, deleting, copying, pasting, for example, by the owner or other authorized user), etc.

The caption of the content body 306 may be recorded in the form of a caption body chain.

Assuming that PContent is content body by name of P, and ContentP is an instance of this content body, an exemplary content body for ContentP may be recorded in the following form of caption body chain: (OriginCircleCap) .OriginContactCap[(RepostCircleCapi1).RepostContact-Capi1+(RepostCircleCapi2).RepostCircleCapi2+ . . . ].PContentBody {CapContent LogicCalculation DKM Chain}, wherein the content body's author may be (OriginContact), the original C may be (OriginCircle), both of them are self-carried factors, and the expressions may be similar to key's expression, as (PCircle)P.

Caption Body 308

The caption body 308 may carry the summarized or simplified profile of the information flow body 302 and may be the formula for the captions of the contact body 304 and the content body 306. The caption may be generated and managed by a creator or an authorized user. The record of the caption may be displayed, and the key may be derived from the caption body chain.

In terms of the structure, the caption body 308 may include a public page (Profile), a dynamic keys management unit, and a public page controller. The public page may be configured to carry a user profile that is open to the public. The dynamic keys management unit may be configured to manage dynamic keys. The public page controller may be configured to control the public page.

In terms of the content, the public page may include name, picture, slogan, slide show of notifications, etc. The information section may include videos, pictures, and texts. The dynamic keys management unit may include dynamic keys. The public page controller may include the public page.

In terms of the approach, the caption body 308 may be able to provide functions, such as referring, coupling, etc.

Circle Body 310

The circle body 310 may be the formula for an information flow management tool, which will be described below. The circle body 310 may be used to harbor features in docks. One access level and another access level may be combined as needed when a user builds up his/her cyber-image, which is a reflection of his/her real-life in the form of relationship definition priority. All the access levels may be combined by a way of dynamic data exchange connection.

In terms of the structure, the circle body 310 may include a caption public page controller, a contact pool, a dialogue (Chat) dock, a post dock, a library dock, a calendar, an additional dock for special features, and a dynamic keys management recorder, the structure is the framework of InFlux.

In terms of the content, the caption public page controller may include the caption of the access level in the form of the caption body 308. The contact pool may be in the form of the contact body 304. The dialogue (Chat) dock carries all the dialogue. The post dock may be in the form of the content body 306. The library dock may be in the form of the content body 306. The calendar may include information on dynamic date exchange with other elements.

In terms of the approach, the circle body 310 may be able to provide functions, such as creating access level, editing, deleting, searching, joining, leaving, setting, installing, etc.

The caption of the circle body 310 may be recorded in the form of a caption body chain.

An access level may represent a group of people who share a common attribute. The structure of the access levels may meet the requirement of a cyber-image for a real person. Each access level may be stackable and connected up-and-down. All the data in common features in different access levels may be synced, merged, and managed.

To make the access level have connectivity both vertically (i.e., among different access levels) and horizontally (i.e., in the same access level), each access level may be structured with the inheritable interface in both features and the way how each access level carries the features.

An exemplary circle body may be recorded in the following form of caption body chain: CCircleBody{Cap ContactPool Chat Post Lib Calendar SpFeature}.Factor1.Factor2, a factor can be generated by a user's setting.

Figure 4:
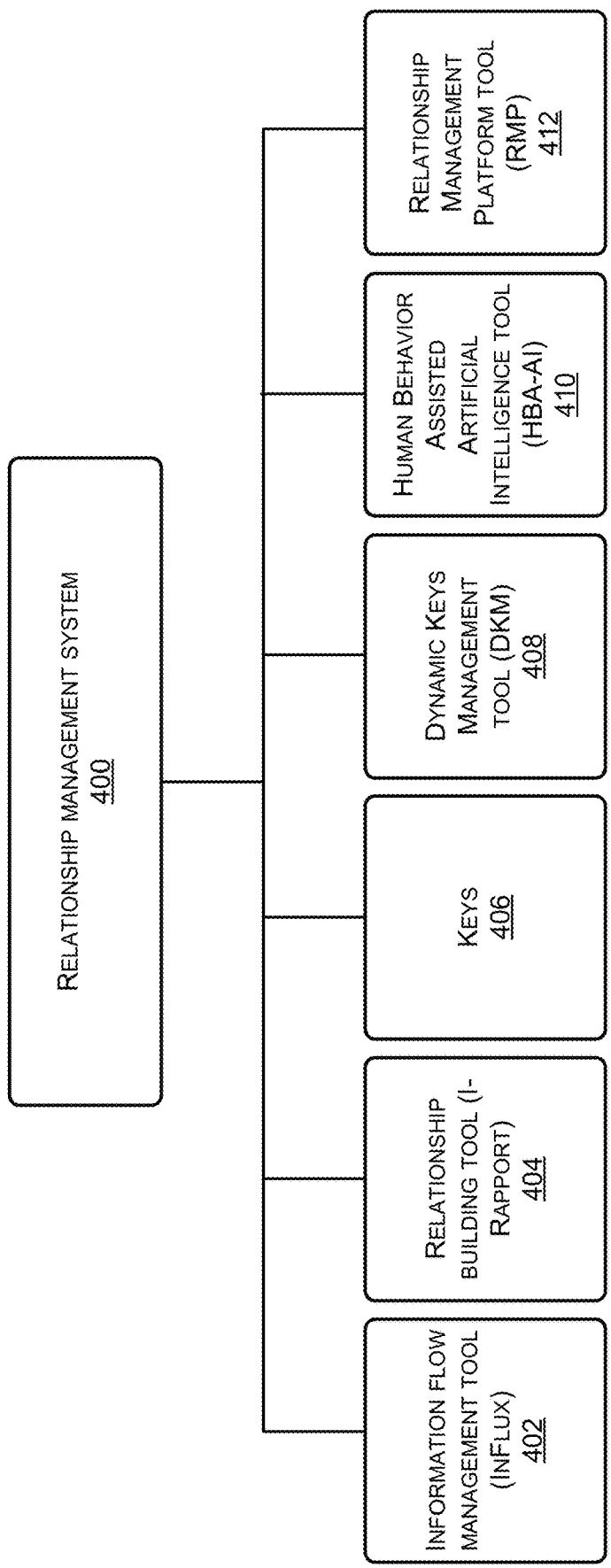
FIG. 4 illustrates a diagram of example tools associated with an example relationships management system.

FIG. 4 illustrates a diagram of example tools associated with an example relationships management system 400.

The relationships management system 400 may be configured to manage relationships in multiple access levels.

To image lives in an accurate and optimized way, the relationships management system 400 may include one or more of the following tools: information flow management tool (InFlux) 402, relationship building tool (I-Rapport) 404, keys 406, Dynamic Keys Management tool (DKM) 408, Human Behavior Assisted Artificial Intelligence tool (HBA-AI) 410, and relationships management platform tool (RMP) 412. In some instances, the above tools may be implemented as hardware, software/algorithms, firmware, or any combination thereof. Additional details of the tools are described hereinafter.

Information Flow Management Tool (InFlux) 402

The information flow management tool (InFlux) 402 may be a practical design that enables built-in features of an access level to act as an advanced communication tool capable of digitally representing a full set of information flows in human society and unparalleled efficiency in all regards of information management. One access level may be an instance of the information flow management tool 402 in the form of the circle body.

With the information flow management tool 402, the relationships management system 400 may implement functions such as Chat, Post, Read, Learn, Search, Archive, Radio, Schedule, Pay, Share, Event, Invitation, Reservation, Order-Place, Bid, Vote, Group-on, Broadcast, Alert, Bookkeeping, learn, teach, consult etc. For example, the implementation of the information flow management tool 402 may be the customization of elements (e.g., settings and features) in a templated access level.

The structure of information flow management tool 402 may include a contact interface (i.e., contact dock), a chat interface (i.e., chat dock), a post interface (i.e., post dock), a library interface (i.e., library dock), a calendar interface, and other interfaces. The contact interface may include information flows of contacts. The chat interface may include information flows of chats. The post interface may include information flows of posts. The library interface may include information flows of libraries. The calendar interface may include information flows of calendars events. The elements of the information flow management tool 402 may are described by elements such as the contact body, the content body, and the calendar.

The information flows may include information in different formalities. For example, the information flows may include the source of the information and the boundary of the information flows. The source of the information may be the producer or provider of the information. The boundary of the information flows may be defined by the source of the information in terms of the connection between or among the sources which is built up by a common factor, for example, a shared attribute or the same interest.

The information flow management tool 402 may enclose all possible information flows into a relationship. Activities in the relationship may be organized. Two or more relationships may be interlaced. Information flows may be categorized. Examples of categories may be a dialogue (e.g., chat), broadcasting (e.g., post), archive (e.g., library), and additional categories (e.g., vote), etc. The structure of the information flow management tool 402 may be extensible such that the information flow management tool 402 is capable of including all the unknown formalities of information flow in the future.

The information flow management tool 402 may provide an all-in-one platform in which all existing Apps could be bundled and organized in one interface. For example, different social Apps may be in one access level in which a user can conduct all kinds of information flows as features from all existing social Apps in this relationship. Since the flows will be under the user's control, the personal information of the user is well protected.

Another attribute of information flow management tool 402 is the capability to handle the diversity of information flows, in other words, all the possible formalities of human beings are assured by the essence of the greatest common factor (GCF). When a group of people is connected as a group due to a common attribute or the same interest, a specific type of information flow may be used to serve the people in the group and, at the same or similar time, to keep the people connected as a group. All the common formalities of information flows will be in service for most of the time. All the specific types of information flow may be carried out by special instances of the content body.

The information flow management tool 402 may enhance the efficiency of communication and management by making all the activities in a relationship yield to the priority of the relationship definition. The information flow management tool 402 may allow users to define relationships and conduct all possible types of information flows at one interface. The information flow management tool 402 may be implemented by an instance of the circle body.

A set of cross-relationship information flows may be invented to facilitate the dynamics of relationships management. To meet the requirement of a full set of information flows in a relationship, the information flow management tool 402 may have three cross-relationship features.

The first cross-relationship feature (also referred to as Radio) may be configured to send and receive information between users (including strangers). The first cross-relationship feature may also be a tool to discover the invisible relationship.

The second cross-relationship feature (also referred to as Getit (Short cut for subscribe)) may be configured to show the selected content in another user's access level.

The third cross-relationship feature (also referred to as Merge) may be configured to merge all the contacts, calendar contents, and some special features to the access level. For example, when the user merges the contents of a first calendar associated with a first access level to a second calendar associated with a second access level, the contents of the first calendar may be copied and reprinted into the second calendar. As another example, when the user merges the information flow posted in the first access level to the second access level, the information flow posted in the first access level may be reposted in the second access level.

The structure (e.g., an instance of the circle body) of the information flow management tool 402 may include a contact dock, a chat dock, a post dock, a library dock, a calendar, and an additional dock.

Relationship Building Tool (I-Rapport) 404

The relationship building tool (I-Rapport) 404 may be configured to build rapport naturally, instantly, and accurately in the relationships management system.

Rapport may refer to a close relationship in which the people connected based on certain common attributes. By implementation of the relationship building tool 404, the relationships management system 400 can be applied to any group of people which has common attributes easily and instantly. Examples of people having common attributes may be residents in a community, members in a church, kids in a classroom, fans of a character, co-workers in an office, and friends with the same hobbies, etc. The user profile may be associated with different relationships/connections and may switch between different relationships/connections. The user profile does not need to be associated with Apps nor cell phones/devices.

The relationship building tool 404 may provide an efficient and quick response mechanism to build, fit in, and adjust the relationships that users define.

The relationship building tool 404 may include a relationship identification and categorization unit.

The relationship identification and categorization unit may be configured to identify the relationship needs to find the right template for the target relationship. Templates of the access level may be divided into different categories, such as myself, my family, my friend, my business, my property, my neighbor, etc. Each template may include the most representative features in that relationship. For example, when a user tries to build up an access level, in other words, to image one social relationship, most of the scenario will fall into one of the above-mentioned templates. For example, an access level for a church member may be built by customizing the template of my neighbor, and an access level for a schoolfellow may be built by customizing the template of my friend.

The templates may be stored in a bank of customized instances of the content body (e.g., special features) in the information flow management tool 402. All the special features and basic features may be regrouped into an access level. The bank may provide accurate templates representing specific relationships for individuals, professionals, small-medium enterprise (SME) owners, organizations, etc.

In the relationships management system, a browser may identify the item that needs to be filled in with the right content, automatically update as any changes made by users, and even carry the account name and password where appropriate encryption applied. Furthermore, for the situation where the content needs to be filled with its subject to different scenarios in one relationship, the relationship building tool 404 may provide more than one option for all the content including account name, password, payment method, etc. For example, when the user registers a business account, the relationship building tool 404 may perform the auto-fill for the payment method using a working credit card. As another example, when the user registers a personal account, the relationship building tool 404 may perform the auto-fill for the payment method using a personal credit card. The relationship building tool 404 may be configured to collect, organize, and save account information for the user under different environments, so as to perform auto-fill and/or auto-refill in different scenarios efficiently, accurately and flexibly.

Besides content needs to fill in at registration, the information that a user would like to share or disclose in a relationship could be even more complicated. The relationship building tool 404 may carry a full set of user's information and may listen to the user's instruction on which part(s) should be open to the public in a certain relationship. The full set of user's information may be linked by the captions which are in all the instances of the contact body and the content body owned by the user. Whenever and where ever the user's information is needed, the relationship building tool 404 may be able to locate the right content which is contingent on relationships and the settings of the user in the access level, rendering the right information in the form of a certain information flow body.

The relationship building tool (I-Rapport) 404 may be configured to find out the common attribute, even no access level has been established but the relationship is ready. For example, when a house owner needs a painter, when a painter needs a job, or when either party reaches out by broadcasting in an access level, the other party may be reached out by receiving the broadcasting in an access level, and the two access levels can be coupled by the effect of broadcasting and the relationship building tool 404.

The relationship building tool 404 may be configured to build the connection between two strangers by a pair of secured access levels based on the common attribute. For example, there is a moment that a driver needs to talk to a stranger who parked the car in an inconvenient spot, the driver does not have to know the phone number of the stranger, the relationship building tool 404 of the driver may enable the driver to contact the stranger by a pair of secured access levels. If both the driver and the stranger are users of the relationships management system, they can communicate with each other through respective access levels. If one person is not a user of the relationships management system, he/she may access the web version of the relationships management system and establish a profile and an access level to communicate with the other person. As such, a temporary relationship can be established via the relationships management system, just like two persons shaking hands with mittens, such that the privacy of each person can be protected.

The relationship building tool 404 may be configured to provide virtual experience in a relationship. For example, before establishing a relationship, a user can utilize a templated access level to have a virtual experience.

There may be three major types of rapports that exist in human society, which are imaged access level, visiting access level, and subscribing access level. As described throughout the disclosure, the type of the key may be represented by Boolean operators, such as IUI, IU0, 0UI, 0U0, and the like. IUI may represent access to an imaged access level, i.e., the mutual acceptance access level, and may indicate an imaged key type. IU0 may represent access to a visiting access level and may indicate a visiting key type. 0UI may represent access to a subscribing access level and may indicate a subscribing key type. 0U0 may represent invalid access and indicate an invalid key type. Each of IUI, IU0, 0UI may be based on one active persona of a user, which is represented by an active IUI access level.

The imaged access level may correspond to a relationship that everyone has the equity within the relationship, which is similar to a peer-to-peer network. This imaged relationship may represent a serious and mutual social connection, everyone in the relationship has a contribution to the group and vice versa. The imaged access level may contribute to the participant's cyber-image. The information flows in an imaged access level may be on both way and everyone may broadcast and receive and have the same access to chat/post/library/calendar.

The visiting access level may correspond to a relationship that the creator or authorized contacts in the visiting access level to have a higher authority regarding information flows For example, in the visiting access level, everyone can chat, but only the creator and authorized users have the full access to post/library/calendar, the rest only have limited access (e.g., read and response only). All the members other than the creator and authorized users have to get a permit (Key) to get access to the visiting access level.

The subscribing access level may correspond to a relationship that all the members other than the creator can have access to the subscribing access level without a permit from the creator.

Keys 406

In the access level, a key may refer to a relationship. All the information flows (e.g., in a form of information flow body) may carry a fraction of one or more relationships, and the key may be the way to describe the fraction which is the caption in all related instances of the information flow bodies.

An exemplary simplified expression of the key may be as follows:

$$X-(YC\text{'s Name})Y1-TK\text{-No.} \qquad (2)$$

In the above expression (2), wherein X may represent the holder of the key, and X may also carry the information of an access level of X and by which X holds the key. In other words, the relationship between X and Y may be through two Cs (access levels). In a simplified version of a Key, the expression may not show the X's access level.

In the above expression (2), C's name may represent the caption of the access level.

In the above expression (2), Y may represent the creator of the access level. Y1 may represent the imager and the issuer of the key.

In the above expression (2), TK may represent the type of the key, i.e., IUI, IU0, 0UI, and 0U0. IUI may represent access to an imaged access level and may indicate an imaged key type. IU0 may represent access to a visiting access level and may indicate a visiting key type. 0UI may represent access to a subscribing access level, and may indicate a subscribing key type. 0U0 may represent invalid access and indicate an invalid key type.

In the above expression (2), No. may represent the sequence number in the access level, i.e., the number of the key issued in order.

In the above expression (2), (Y C's Name) may represent the original access level.

The above description may be directed to the simplified expression of the key. A key may also be described in an extended way.

An exemplary extended expression of the key may be in the following form:

$$(X\ Cx\text{'s Name})-(Y\ C\text{'s Name})(Y1\ Cy_1\text{'s Name})-TK\text{-No.-ID No.} \qquad (3)$$

In the above expression (3), X may represent the key holder;

In the above expression (3), Cx's Name may represent the access level through which X holds the key. Also, this access level indicates/links to what basic social relationship X has defined in X's MyselfC;

In the above expression (3), Y may represent the Owner of Target C;

In the above expression (3), C's Name may represent Target C;

In the above expression (3), Y1 may represent the key Issuer;

In the above expression (3), $Cy_1$'s Name may represent the access level through which Y1 issues the key;

In the above expression (3), TK may represent the type of the key;

In the above expression (3), No. may represent the serious number of the key through which other people can access to the target C;

In the above expression (3), ID No. may represent the ID of the key in Cs' Universe;

In the above expression (3), C and $Cy_1$ can be the same C (access level) or not the same C (access level).

An exemplary dynamic extended expression of the key may be in the following form:

$$(X.\text{Fatror}X1.\text{Factor}X2\ldots\\
Cx\text{'sName.Factor}Cx1.\text{Factor}Cx2\ldots\\
)-(Y.\text{Factor}Y1.\text{Factor}Y2\ldots\\
C\text{'sName.Factor}C1.\text{Factor}C2\ldots\\
)(Y_1.\text{Factor}Y_11.\text{Factor}Y_12\ldots Cy_1\text{'s}\\
\text{Name.Factor}Cy_11.Cy_12\ldots)-TK\text{-No.-ID No.} \qquad (4)$$

In the above expression (4), FactorX1.FactorX2. may carry information from X's slogan in ContactBodyCaption in Cx;

In the above expression (4), FactorCx1.FactorCx2. may carry information from Cx's CBodyCaption (Cx here stands for a basic social relationship defined by X in X's MyselfC);

In the above expression (4), FactorY1.FactorY2. may carry information from Y's slogan in ContactBodyCaption in C;

In the above expression (4), FactorC1.FactorC2. may carry information from C's CBodyCaption;

In the above expression (4), $FactorY_11.FactorY_12$. may carry information from $Y_1$'s slogan in ContactBodyCaption in Cyr;

In the above expression (4), Factor $Cy_1$1.Factor $Cy_1$2. may carry information from $Cy_1$'s CBodyCaption.

Based on the expression of the original access level, the expression may be depicted with factors (also called template factors). For example, Family stands for family, Buddies stands for friends, and Church stands for a church.

For example, Y's Michael.Family may mean that Y created an access level with the name of Michael, and it is a family access level for his family. There could be a series of factors attached to the key expression of this access level.

For another example, Z's (Friend.Badminton) may refer to an access level for friends with the domain of badminton, so the tier of factor as of badminton is a lower-tier factor compared to a friend.

Every access level may be assigned a unique system code which is carried by the key. Also, all the factors may be lined up in the expression of the key as following: (Y C's name) Y1.Y2.Y3.Y4 . . . . Yi. Yi may also carry the information of an access level of Y and by which Y issues the key. In other words, the relationship between Y and another user may be through two Cs (access levels). In a simplified version of a Key, the expression may not show the Yi's access level.

This record in the form of key may represent the history of imaged users (i.e., users who image the access level). For the simplified expression of the key, only the last user (e.g., Y1) who shares the key may be expressed.

Based on the expression of a key, the relationship between access levels and the contacts may be found. When serving as access, the key may be in a simplified expression, and when serving as a relationship, the key may be in an extended-expression. When the access levels need to describe the relationships, all the factors carried may be taken in as inputs for a logic calculation.

When an access level needs to be searched and located, the action to fulfill the search and location may be through a logic calculation in various access levels in the whole universe of the relationships management system. A search may be carried out for all possible keys which have captions on target access levels. One access level may include a collection of keys who have all types of access into this access level, and the contacts in the contact pool of the access level may be the key holders of all the keys. In other words, the search on an access level may be the search for the key holders who have access to the access level.

Also, all the keys related to user Y may be searched out.

Y-( )- - may represent the full set of the keys held by Y. Y may also carry the information of an access level of Y and by which Y holds or issues the key. In other words, the relationship between Y and another user may be through two Cs (access levels). In a simplified version of a Key, the expression may not show the Y's access level.

-( )Y- - may represent the full set of the keys issued by Y. Y may also carry the information of an access level of Y and by which Y holds or issues the key. In other words, the relationship between Y and another user may be through two Cs (access levels). In a simplified version of a Key, the expression may not show the Y's access level.

-(Y)- - may represent the full set of the keys of an access level created by Y.

If Y's caption chain contains a factor A as Y. Factor A, all the potential relationships (i.e., invisible relationships) may be described as ?.Factor A, wherein ? stands for all the contacts that may be in a relationship with Y because of the factor A.

The applications of the key may include labeling and connection build-up. All the keys that contact A holds serve another purpose as of labeling. The keys may have the captions of all instance of the circle bodies which the contact A have access, including imaged, visiting and subscribing access levels, all the captions may serve a function of labeling for search and connection build-up.

Now a visiting access level (e.g., a business access level) may be taken as an example of a referral.

As a barber, A1 may create his business access level with the name of A1 Barber, i.e., an instance of a visiting access level. As a customer, B1 may have the visiting access to (A1Barber), i.e., B1 may be the visitor to A1's business access level. In this case, the key for B1 access to (A1Barber) may be B1-(A1Barber)A1-IU0-X. B1 may also carry the information of an access level of B1 and by which B1 holds or issues the key. In other words, the relationship between B1 and A1 may be through two Cs (access levels). In a simplified version of a Key, the expression may not show the B1's access level.

B1 may be satisfied with A1's service and would refer A1's business to his friend B2 by sending the key of (A1Barber) to B2, so the key B2 receives from B1 may be @-(A1Barber)A1-B1-IU0-X. Upon receiving the key sent by B1, B2 may send out the request to A1. Upon A1's approval, the key may be validated and active. The key may be B2-(A1Barber)A1-B1-IU0-X, which may be simplified as B2-(A1Barber)B1-IU0-X. B2 may also carry the information of an access level of B2 and by which B2 holds the key. In other words, the relationship between B2 and A1 may be through two Cs (access levels). In a simplified version of a Key, the expression may not show the B2's access level.

Now a subscribing access level (e.g., a reading club access level) may be taken as an example of a referral.

As a reader, A3 may create his reading club access level with the name of A3ReadingClub, i.e., an instance of a subscribing access level. As a listener, B1 may subscribe (A3ReadingClub) and have the listener's key, i.e., B1-(A3ReadingClub)A3-0UI-X B1 may also carry the information of an access level of B1 and by which B1 holds or issues the key. In other words, the relationship between B1 and A3 may be through two Cs (access levels). In a simplified version of a Key, the expression may not show the B1's access level. B1 may be satisfied with A3's content and may refer (A3ReadingClub) to B5, so the key B5 receives may be @-(A3ReadingClub)A3-B1-0UI-X Upon B5's acceptance, B5 may have the validated and active key as a subscriber, i.e., B5-(A3ReadingClub)A3-B1-0UI-X. B5 may also carry the information of an access level of B5 and by which B5 holds the key. In other words, the relationship between B5 and A3 may be through two Cs (access levels). In a simplified version of a Key, the expression may not show the B5's access level.

A key may be carried by the content body.

All the content body may carry keys, and the key may be displayed as a system assigned code in the content. Once the content viewer finds the key, the user can pick up the key or ignore the key. The author of the content body may have control of whether to display the key in the content or not. The key may be an imaged key, a visiting key, or a subscribing key.

For example, as an instance of the content body may be the advertisement of A1's barber business with the name of BarberPromo1, the caption is BarberPromo1 (the caption may be generated by the system or the creator). Since the key is originated from the content body, the caption may also be considered as a label. For better promotion, the more factors in the key, the better in impact with less reputation. If A1 is not a famous barber, he may need more factors to promote, but if he is a very famous barber, not many factors are needed at all.

The inviting key combined with BarberPromo1 may be @-(A1Barber)A1.BarberPromo1-IU0-X.

When B5 notices the content body, the A1BarberPromo, and B5 may decide to pick up the key by scanning the code assigned by the access levels, which also initiate the request to join the access level of A1Barber. Upon A1's approval, the key B5-(A1Barber)A1.BarberPromo1-IU0-X is validated and active. B5 may also carry the information of an access level of B5 and by which B5 holds the key. In other words, the relationship between B5 and A1 may be through two Cs (access levels). In a simplified version of a Key, the expression may not show the B5's access level.

For example, if an instance of the content body is the episode of A3's reading from his reading club with the name of ReadingClubStory1, then the key carried by the content body may be @-(A3ReadingClub)A3.ReadingClubStory1-0UI-X Anyone who runs into this episode may pick up the key and have access to (A3ReadingClub) without any further approval. B5-(A3ReadingClub)A3.ReadingClubStory1-0UI-X will be validated and active at once upon acceptance by B5. B5 may also carry the information of an access level of B5 and by which B5 holds the key. In other words, the relationship between B5 and A3 may be through two Cs (access levels). In a simplified version of a Key, the expression may not show the B5's access level.

The name of the access level may also show up on the caption of the access level, which may be served as a factor. Story 1, as the name of the story, may be a lower-tier factor that can identify target listeners by the scope of interest. A line of factors may bring promotion in better accuracy and a deeper impact by targeting listeners more accurately.

Dynamic Keys Management Tool (DKM) 408

The Dynamic Keys Management tool (DKM) 408 may be configured to manage the keys dynamically.

The Dynamic Keys Management tool 408 may be configured to make the relationships management system 400 a fully represented personae for each one as privacy in control, but not to control privacy. The dynamic keys management tool 408 may also keep the tracks of relationships as a result of the timeline.

The Dynamic Keys Management tool 408 may be the approach for search, which is the process of connection build-up. The search result may lie in three different keys, i.e., imaged key, visiting key, and subscribing key. The imaged key may correspond to the need for mutual confirmation. The visiting key may correspond to the need for the approval of the administrator (e.g., the creator or authorized users) of the access level. The subscribing key may correspond to the situation where there is no need for approval, i.e., a user has the key validated and active immediately as long as a key is accepted by the user.

For example, A1 just settled at a new town, and A1 sent out research for new social connections. DKM will parse the keywords in the search out and pick them up as the matching words for factors in keys (caption body chain for contact body, content body, or circle body). A1 can search for people (contact body), events (content body), and relationships (circle body).

In some instances, the searching expression may include keywords 1 and 2, the keywords can be referred to as caption information on the contact body, content body, and circle body. All the keywords can be added one after another.

An exemplary searching expression may be A1-(M_ _) M.Description1.Description2._U_.X, wherein Description1 and Description2 are the key words made by A1, those are what A1 would like to get hold of, and M, as a variable in an equation, represents the unknown part. When start to search, Description 1 and 2 will be read as 1&2, i.e., 1 and 2.

The search result may be 0UI and IU0. For imaged IUI, it may be validated and active upon mutual acceptance. The exemplary search result expression may be @-(M_) M Description1. IU0. X When A1 gets hold of this inactive key, upon acceptance, A1 may send out a request to M. Upon M's approval, the key for A1 may be validated and active. The key for A1 may be A1-(M_ _) M.Description1.IU0.X A1 may also carry the information of an access level of A1 and by which A1 holds the key. In other words, the relationship between A1 and M may be through two Cs (access levels). In a simplified version of a Key, the expression may not show the A1's access level.

The purpose of a search action is to build up a connection. All the connections (i.e., relationships) may be described by the Dynamic Keys Management tool 408. All the elements of a key may be from the captions of the information flow body.

All the keywords in a search may be led to a certain contact body, content body, and circle body. The relationship may be between two people via two access levels from which two people reach out and by which the connection is built up, in other words, all connections built up in Cs (access levels) are through access levels.

The following description is directed to the example of an XContactBody search.

BContact may send out a search with a description of A, which is the name of a person. After searching, AContact may be the possible result that meets the contact body search criteria.

If A has set no access level open to the public, then there may not be an available key for B to validate and no access level B can have access to. However, AContact may still receive the request sent by B (as a result after a search). The request may be an invalid key from one access level of B by which B reaches out with, i.e., BOpenFriendC, and the request may be the invalid key as @-(BOpenFreindC)B-IU0-X The request as a mail from an unknown (may be known in real world but not in a Cs' relationship yet) may be sent into the radio feature in AContact's MySelf access level (or A's Stranger access level, depend on A's preference). (Radio may be a pre-installed feature in Post, aimed for receiving and sending information from strangers or system).

If AContact would like to accept the request to validate the key, which is upon acceptance of the request, AContact may send the response to (BOpenFriendC). Now, the sending out may be from AContact's Myself access level (or A's Stranger access level). Upon B's approval, A may have a validated and active key A-(BOpenFriendC)B-IU0-X, where A may also carry the information of A's MyselfC (or A's StrangerC) as the access level by which A holds the key. Now, A may be existing in the contact pool of (BOpenFriendC) as a Visitor. When displaying the ContactA in an expansion, B may find no access level of AContact open to the public or B (Stranger in A's MyselfC or StrangerC don't give any access to the strangers), which indicates that B has no access to any access level of A, even AContact is a visitor and has access to (BOpenFriendC). Therefore, the relationship may not be equal.

To B, A can be considered as still a visiting stranger. In the meantime, upon B's approval on A's response to @-(BOpenFreindC)B-IU0-X, the key may be validated as A-(BOpenFreindC)B-IU0-X, where A may carry the information of A's MyselfC (or A's StrangerC) as the access level by which A holds the key. At the same or similar time, in the category of A's MyselfC (or A's StrangerC) visiting access levels, An instance (copied) (BOpenFriendC) may be created. Also, in the contact pool of A's Myself access level (or stranger access level), the ContactB may be added. In the expansion of ContactB, A may find an access level (at least one access level, but if B sets other access levels open to the public, A may also find those access levels) which A has key and access to, i.e., the access level of (BOpenFriendC), but ContactB, as BContact's contact information, may only exist in A's Myself access level (or Stranger access level) as a stranger.

Since A has not invited B into any access level of A (MyselfC and StrangerC don't count), the BContact, as a contact (ContactB), may only exist in A's Myself access level (or Stranger access level) as a stranger. If B sets his reading club access level (BOpenC2) open to the public, upon acceptance of the inviting Key as @-(BOpenC2)B-0UI-X (this key may be picked up from BOpenC2's icon (Cap) in the expansion of ContactB or a shared reading material created by B), A may have the key A-(BOpenC2) B-0UI-X immediately without B's approval. A may carry the information of A's MyselfC (or StrangerC) as the access level by which A holds the key.

Once the key of A-(BOpenC2)B-0UI-X is validated, or in other words once A accepts the invitation, AContact's contact information as of ContactA may show up in BOpenC2's contact pool, as a subscriber, the same as in BOpenFriendC, the ContactA's expansion may show no access level open to B. An instance of the information flow management tool 402 in the Relationship Building Tool 404 of subscribing may be created in the category of A's subscribing access levels.

When A decides to open an access level to B, the BContact's contact information ContactB may be moved to that access level, as well as all the subscribed channels in Getit (a pre-installed feature in Post) of that access level (sub-dock in subscribing access levels may be showed). In ContactB's expansion, A may find two access levels that A has two keys.

When AContact accepted BContact's invitation, AContact may open an access level by which A can build up a connection with B. For example, A may decide to open a first access level for a relationship with B, and A may move ContentB to the first access level. A may hold the first access level as the one by which A holds the key. At the same or similar time, a request (in the form of an invalid key) may be sent out from A. Details of several types of keys may be given hereinafter.

Imaged Key Type

An exemplary example of the imaged key type may be @-(AC1) A-IU0-X or @-(AC1) A-0UI-X. A can decide which type of key will be sent out. The request may reach BOpenFriendC. Different from the situation when B reaches out A, the request may not go to Radio at B's MyselfC (or StrangerC) since B may have an access level open to A already, in other words, B may not be a stranger to A, even A is a stranger to B. B's open access level to A may be (BOpenFriendC), and this access level may be the interface to build up the relationship (from one-way to both-way). In the real world, all the relationships may grow into mutual from one-way to both-way. A and B may have multiple relationships (multiple access levels stand for different relationships) by open multiple access levels between each other.

When accepting the request of @-(AC1)A-IU0-X, B has the key of B-(AC1)A-IU0-X, and B may hold the information of BOpenFriendC as the access level by which B holds the key. B may also request to be an imager of AC1 by sending a request back to A. One this request is accepted by A, B may have the key of B-(AC1)A-IUI-X, which stands for the imaging relationship between A and B, and AC1 may be an instance of the information flow management tool 402 in the form of the relationship building tool 404 of imaging. Now, in B's access levels, a MyselfC B(AC1) may be created. So in B's access levels, there may be four access levels that are associated with ContentA, one in (BOpenfriendC), as a visitor; one in (BOpenC2), as a subscriber; one in B(AC1) as an imager, and one in B's MySelfC (as a merged contacts in whole B's Cs). The expansion of ContentA may have one open access level to B.

At the same or similar time, in AContact's access levels, there may be two access levels that are associated with ContentB, (AC1) and A's MySelfC. In the contact pool of A's MySelfC, the ContentB may no longer be labeled as a stranger. The expansion of ContentB may have three open access levels to A. All the different types of access levels in forms of the relationship building tool 404 may be color for easy identification, for example, red for imaged, blue for visiting, yellow for subscribing. The relationship between AContact and BContact may be described as:

A visits B at BOpenFriendC,
A subscribes B at BOpenC2
A and B are imaged at AC1.

The imaged key may have to be initiated by the access level's creator or authorized member.

Visiting Key Type

As to the visiting key type, if A sends a request to B as @-(AC1)A-IU0-X, after B accepts the request in (BOpenFriendC), an instance of the information flow management tool 402 in the form of the relationship building tool 404 of visiting access levels will be created in B's access levels which is in the category of visiting as an instance of (ACI). Now, in the contact pool of two B's access levels, one may find ContactA, which are MySelfC and BOpenFriendC, both labeling ContactA as a visitor. In the expansion of ContactA, B may find one access level of AContact open to B which is the caption of AC1. Similarly, in AContact's access levels, there may be two access levels associated with ContactB in the contact pool and all labeled as a visitor, AMySelfC and AC1. In the expansion of ContactB, A may find two access levels opened by BContact, i.e., (BOpenFriendC), and (BOpenC2).

The relationship of A and B may be described as that A visits B at BOpenfriendC, that A subscribes B at (BOpenC2), or that B visits A at (AC1). In a typical scenario where A is a house owner, AC1 may be A's house access level. As a contractor, B may have a business access level which is BOpenfriendC, and a gallery access level which is BOpenC2. The relationship between A and B may be visiting each other.

Subscribing Key Type

As to the subscribing key type, if A sends a request to B as @-(AC1)A-0UI-X, after B accepts the invitation in (BOpenFriendC), an instance of the information flow management tool 402 in the form of the relationship building tool 404 of subscribing access levels will be created in B's access levels which is in the category of subscribing as of an instance of (ACI). Now, in the contact pool of two B's access levels associated with ContactA, which are MySelfC and BOpenFriendC, ContactA may be labeled as a visitor. In ContactA's expansion, B may find one access level of AContact open to B, which is the caption of AC1. Similarly, in AContact's access levels, there may be two access levels associated with ContactB in the contact pool, which are AMySelfC, and AC1, all labeling ContactB as a subscriber. In the expansion of ContactB, A may find two access levels opened by BContact, i.e., (BOpenFriendC) and (BOpenC2).

The relationship between A and B may be described as that A visits B at BOpenfriendC, that A subscribes B at (BOpenC2), or that B subscribes A at (AC1). In a typical scenario where A is a celebrity, AC1 may be an access level of a fan of A. As a makeup service provider, B may have a business C which is BOpenfriendC and a gallery access level which is BOpenC2. The relationship between A and B may be subscribing to each other.

BContact may stand for a User B, ContactB may stand for an instance of ContactBody, which will be added in a contact pool.

If AContact has an OpenC1 (A Business access level), then when B searches with a keyword of A from the access level of BHome1, the result may be @-(AOpenC1)A-IU0-X. B may pick up the invalid key (invitation) and accept it, at the same or similar time, the request may be sent out from (BHome1). Upon A's approval, B may have the validated and active key of B-(AOpenC1)A-IU0-X. The key of B-(AOpenC1)A-IU0-X may indicate that B is a visitor of AopenC1 from BHome1.

If AContact has an OpenC2 (broadcasting access level), for the search with a keyword of A from one access level of B, the result may be @-(A0penC2)A-0UI-X. As B accepts the key, the key of B-(A0penC2)A-0UI-X may be validated and active, and B may become a subscriber of A's AOpenC2 by one of B's access levels.

Search on the circle body and the content body may be the same or similar procedure as the search for the contact body.

Human Behavior Assisted Artificial Intelligence Tool (HBA-AI) 410

The human behavior assisted artificial intelligence tool (HBA-AI) 410 may be the implementable AI approach carried by the relationships management system 400 for the Cyber World. HBA-AI can be a self-learning/developing AI application that inherits all fore-developed logic loops contributed by the assistance of human behaviors, as a sequential result in constant HBA-AI application, such that the incarnated soul rebuilt by the relationships management system 400 can be as real as a user's image. The soul mimicked by HBA-AI can be represented by the lining up of the social relationships of a person, and the mimicry can answer questions just like the real person even when the person may have passed away.

Human's behavior can be reflected by social relationships, and the social relationships can be reflected by various access levels in the relationships management system. The combination of multiple access levels may cover all kinds of social attributes of a person/user, with each C (access level) represents a social relationship. Multiple Cs (access levels) are put together to describe the person/user's social relationships. Each access level works like a sensor of one aspect of the social life of the person/user, quantifying human social behavior, like analog to digital conversion. Relationships, information, and events related to the person/user can be recorded and analyzed. New data can also be added and updated, such that an unlimited lineup of the social behavior data can be along the time. HBA-AI may be configured to establish a model of the social behavior of the person/user based on historical social behavior data and recreate a virtual self of the person/user. In other words, the soul of the person/user can be rebuilt based on his/her historical social behaviors data. The model can be used to answer questions just like the person/user. Moreover, such a model should be used in a way to benefit the user or the society rather than being used by a third party to achieve specific purposes.

Relationships Management Platform Tool (RMP) 412

The relationships management platform tool (RMP) 412 may empower the access levels to provide features for enhanced and templated relationships management system 400 in multi-scenario of relationships, mitigating competition, and promoting cooperation.

Moreover, the RMP 412 may include a shortcut of sharing storage space to the users within the same access level. In some instances, all of the members of an access level may have access to the sharing storage space through the shortcut provided by the RMP 412. Each of the members may store and/or retrieve data stored in the sharing storage space. For example, in an access level of family, there may be a plurality of family members. Each of the family members may have access to the sharing storage space through the shortcut provided by the RMP 412. For example, a family member may save some pictures in the sharing storage space, and other family members in the same access level of family may retrieve the pictures through the shortcut provided by the RMP 412. In some instances, the sharing storage space may be implemented to be online storage, cloud storage, distributed storage, etc.

Moreover, the RMP 412 may include an interface to a third-party vendor, such that the user may log in to the interface to third-party vendor through relationships management system. When the user already has a third-party vendor account, in that case, the user does not need to type in all the information such as the user name, the password, and the like. The RMP 412 may automatically fill in the information associated with the use at the interface of the third-party vendor when the user logs in to the interface of the third-party vendor through relationships management system. When facing a third-party content provider, the RMP 412 may use a key to open the door of the third-party content provider, such as a cloud storage provider, the content in the cloud storage will be organized by different social relationships. Keys may represent relationships (access levels), people (contacts), things (content body), etc. using expressions. Additional details of the keys are described throughout this disclosure and will not be repeated here. The third-party vendor will provide a sorted and categorized service content fit in a specific application scenario (relationship).

Additional details of the above tools are given throughout this disclosure.

The relationships management system 400 is designed for everyone. Domains of service and application cover from an individual's demands and needs to business's professional requirements and solutions. The relationships management system 400 converges needs vs. supplies, questions vs. answers, and resources 'relocations into grouped relationships in a well-managed manner, which honors the relationship's customization over actions. For example, in the real world, relationship talks. The relationship building tool (I-Rapport) 404 may empower the user to master his or her life through the user profile associated with relationships.

FIG. 5A illustrates a diagram 500 of example relationships between or among individuals.

Referring to FIG. 5A, there may be multiple individuals (users and/or nonusers) establishing and managing different types of relationships with each other via the relationships management system.

In some instances, a first user 502 may build up or otherwise establish a first user profile 502a associated with a plurality of access levels, which may include "Friends 502b", "Family 502c", "Homeowner 502d", "Co-workers 502e", "Strangers 502f", and "Neighbors 502g." A second user 504 may build up or otherwise establish a second user profile 504a associated with a plurality of access levels, which may include "Friends 504b", "Co-workers 504c", "Sports 504d", "Strangers 504e", and "Contractor 504f". A third user 506 may build up or otherwise establish a third user profile 506a associated with a plurality of access levels, which may include "Friends 506b" and "Strangers 506c". An individual 508 may be a nonuser of the relationships management system.

For example, the first user 502 and the second user 504 may establish a relationship of mutual friends. In that case, to the first user 502, the second user 504 may be a friend, and the second user profile 504a may be shown in the access level of Friends 502b. The second user 504 may be able to access the access level of Friends 502b of the first user 502. Meanwhile, to the second user 504, the first user may also be a friend, and the first user profile 502a may be shown in the access level of Friends 504b. The first user 502 may be able to access the access level of Friends 504b of the second user 504. As another example, the first user 502 and the second user 504 may establish an asymmetric relationship, where the first user 502 may take the second user 504 as a contractor, while the second user 504 may take the first user 502 as a homeowner. In that case, to the first user 502, the second user 504 is a contractor, and the second user 504 may access the access level of homeowner 502d of the first user 502. Meanwhile, to the second user 504, the first user is a homeowner, and the first user 502 may access the access level of Contractor 504f of the second user 504. As yet another example, the first user 502 and the second user 504 may establish other types of asymmetric relationships, where the first user 502 may take the second user 504 as a friend, while the second user 504 may take the first user 502 as a co-worker. In that case, to the first user 502, the second user 504 is a friend, and the second user profile 504a may be shown in the access level of Friends 502b. The second user 504 may be able to assess the access level of Friends 502b of the first user 502. Meanwhile, to the second user 504, the first user may be a co-worker, and the first user profile 502a may be shown in the access level of Co-workers 504c. The first user 502 may be able to access the access level of Co-workers 504c of the first user.

Moreover, the first user 502 and the second user 504 may establish a complex relationship. In some instances, the first user 502 may take the second user 504 as having multiple identities. For example, the first user 502 may take the second user 504 as a friend and a contractor. In that case, the second user 504 may be able to access the access level of Friends 502b and the access level of Homeowner 502d of the first user 502. On the other hand, the second user 504 may take the first user 502 as having multiple identities. For example, the second user 504 may take the first user 502 as a friend, a co-worker, and a contractor. In that case, the first user 502 may be able to access the access levels of Friends 504b, Co-workers 504c, and Contractor 504f of the second user 504.

Moreover, the relationship between the first user 502 and the second user 504 may be changed/adjusted along time. For example, the first user 502 changed her job, and is no longer a co-worker to the second user 504. The first user may lose access to the access level of Co-workers 504c of the second user 504. For example, the first user 502 and the second user 504 are no longer co-workers, but as time goes by, the first the first user 502 and the second user 504 become close friends. The first user 502 may merely have access to the access level of Co-workers 504c of the second user at first, and then have the access to the access level of Friends 504b of the second user 504 later on.

For example, the first user 502 and the third user 506 may establish an asymmetric relationship, where the first user 502 may take the third user 506 as a co-worker, while the third user 506 may take the first user 502 as a friend. In that case, to the first user 502, the third user 506 is a co-worker, and the third user profile 506a may be shown in the access level of Co-workers 502e. The third user 506 may be able to access the access level of Co-workers 502e of the first user 502. Meanwhile, to the third user 506, the first user 502 may be a friend, and the first user profile 502a may be shown in the access level of Friends 506b. The first user 502 may be able to access the access level of Friends 506b of the third user 506.

For example, the second user 504 and the third user 506 may establish an asymmetric relationship, where the second user 504 may take the third user 506 as a sports playmate, while the third user 506 may take the second user 504 as a friend. In that case, to the second user 504, the third user 506 is a sports playmate, and the third user profile 506a may be shown in the access level of Sports 504d. The third user 506 may be able to access the access level of Sports 504d of the second user 504. Meanwhile, to the third user 506, the second user 504 may be a friend, and the second user profile 504a may be shown in the access level of friends 506b. The second user 504 may be able to access the access level of friends 506b of the third user 506.

In some instances, the first user 502 may need to establish a relationship with the fourth individual 508 who is a nonuser of the relationships management system, for example, the temporary relationship/one-time connection as described above. The fourth individual 508 may be associated with a computing device 508a. The first user 502 may take the fourth individual as a stranger, and the computing device 508a associated with the fourth individual 508 may be shown in the access level of Strangers 502f. In that case, the first user 502 may establish a temporary relationship/one-time connection with the fourth individual 508 without exposing his/her private contact information. For example, the fourth individual is not a user of the relationships management system, and he/she may access the web version of the relationships management system and establish a profile and an access level, so as to communicate with the first user 502. The fourth individual 508 may be able to access the access level of Strangers 502f of the first user 502 without having access to any other access levels of the first user 502. As such, a temporary relationship can be established via the relationships management system, just like two persons shaking hands with mittens. Thus, the privacy and security may be improved.

In some instances, the second user 504 may establish a relationship with the fourth individual 508 who is a nonuser of the relationships management system in a way similar to that of the first user 502. In that case, the fourth individual 508 may be able to access the access level of Strangers 504e of the second user 504 without having access to any other access levels of the second user 504. Details are not repeated here. As such, privacy and security may be improved.

In some instances, the third user 506 may establish a relationship with the fourth individual 508 who is a nonuser of the relationships management system in a way similar to that of the first user 502. In that case, the fourth individual 508 may be able to access the access level of Strangers 506c of the third user 506 without having access to any other access levels of the third user 506. Details are not repeated here. As such, privacy and security may be improved.

Moreover, the complex relationship may be established between any two users/nonusers. The relationship between any two users/nonusers may be changed/adjusted along time.

Figure 5B:
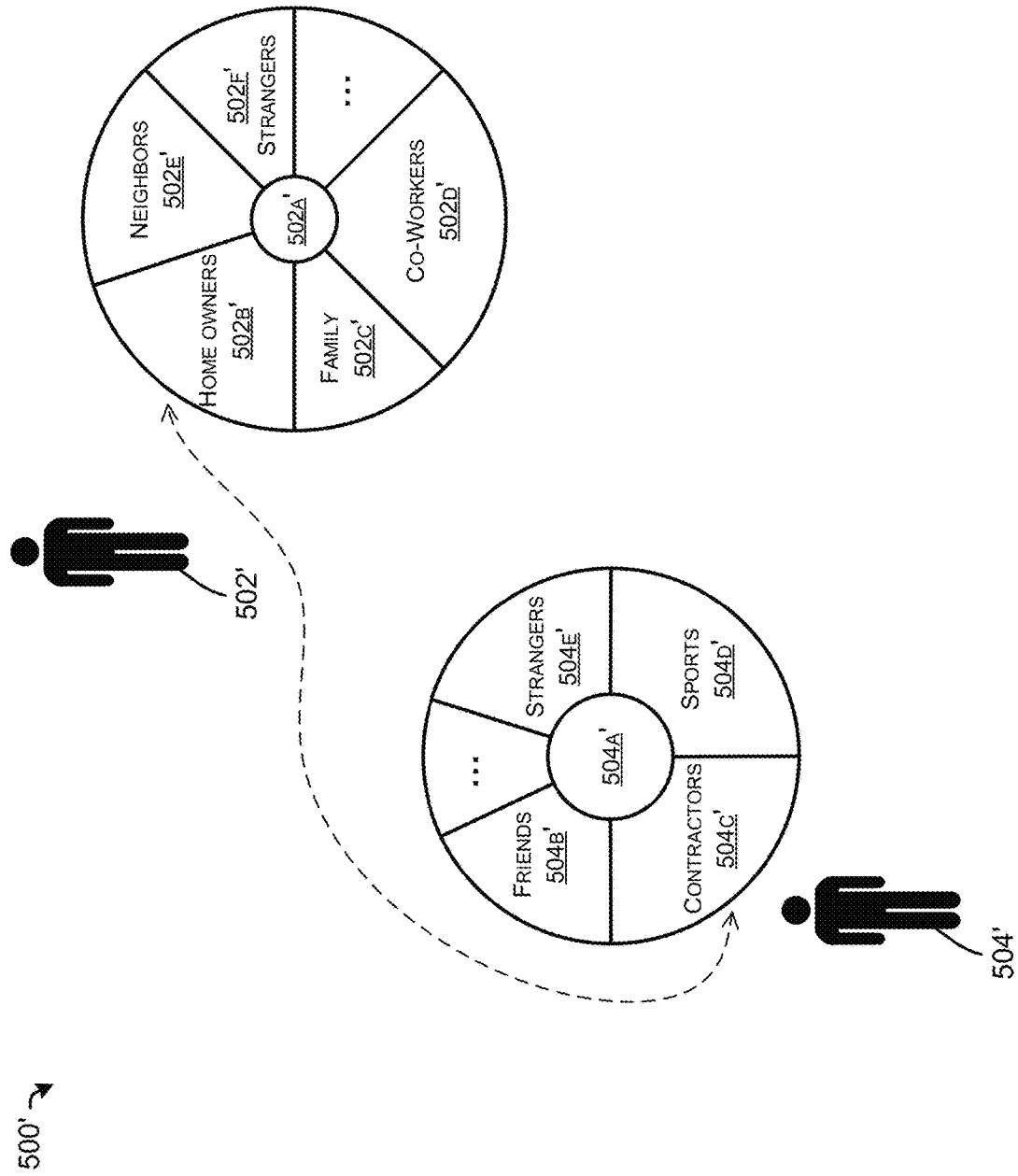
FIG. 5B illustrates a diagram of example relationships between two individuals.

FIG. 5B illustrates a diagram 500' of example relationships between two individuals.

Referring to FIG. 5B, there may be two individuals establishing and managing relationships with each other via the relationships management system.

In some instances, a first user 502' may have a first user profile 502a' associated with a plurality of access levels, which may include Homeowners 502b', Family 502c', Co-workers 502d', Neighbors 502e', Strangers 502f, and so on. A second user 504' may have a second user profile 504a' associated with a plurality of access levels, which may include Friends 504b', Contractors 504c', Sports 504d', Strangers 504e', and so on.

In some instances, the first user 502' and the second user 504' may establish a mutual relationship with protection. For example, the first user 502' may be a homeowner, and the second user 504' may be a contractor working for the first user 502'. In that case, the first user 502' may allow the second user 504' to have access to the access level of Homeowners 502b'. Meanwhile, the second user 504' may allow the first user 502' to have access to the access level of Contractors 504c'. As such, merely one persona (for example, as the homeowner) of the first user 502' is accessible to the second user 504', while other persona of the first user 502' are inaccessible to the second user 504'. The privacy of the first user 502' can be protected. Meanwhile, merely one persona (for example, as the contractor) of the second user 504' is accessible to the first user 502', while other persona of the second user 504' are inaccessible to the first user 502'. The privacy of the second user 504' can also be protected. In other words, a mutual relationship may be established between the first user 502' and the second user 504' through suitable access levels, such that the privacy of each individual can be protected, just like two individuals shake hands with gloves.

Figure 6:
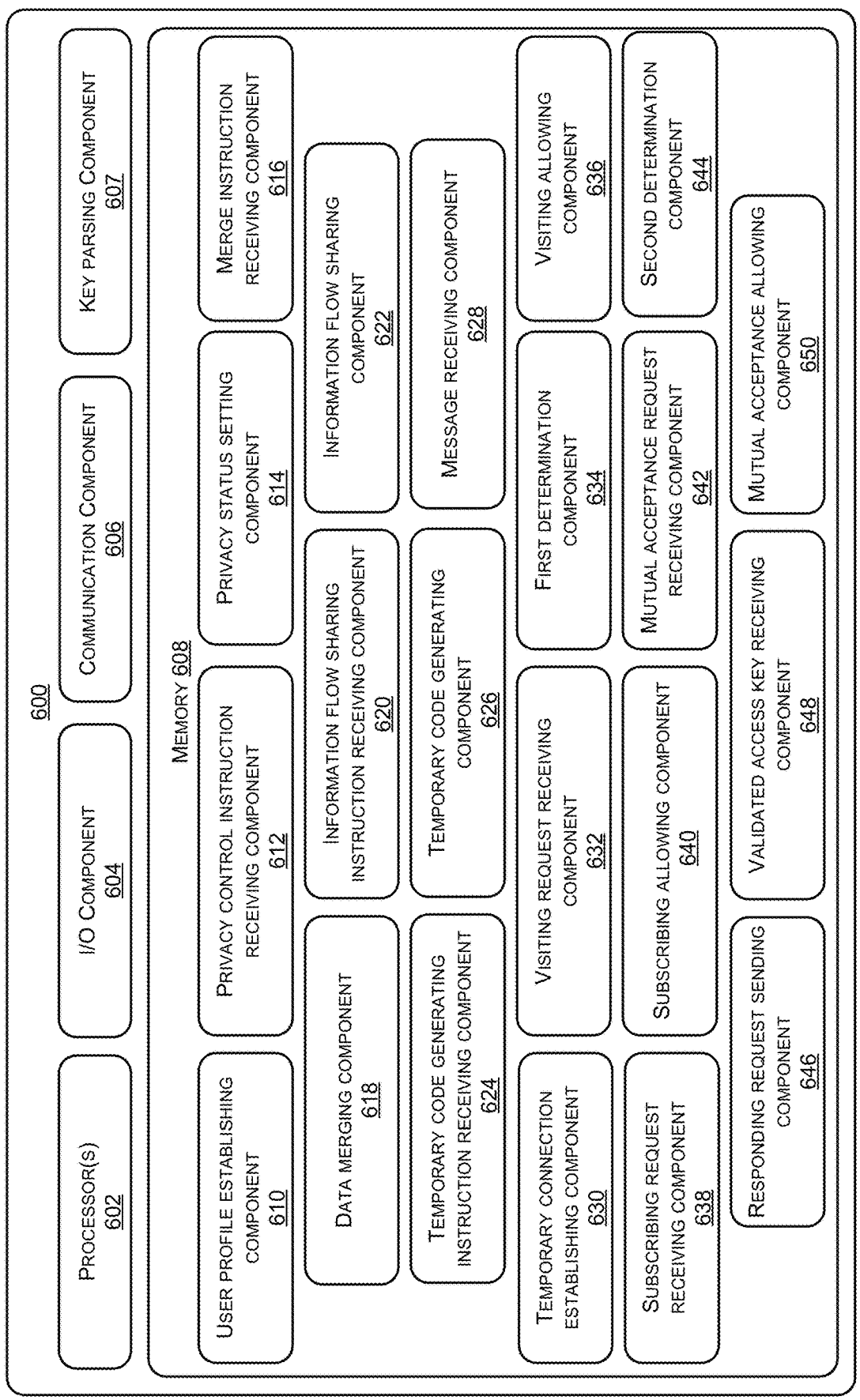
FIG. 6 illustrates a diagram of an example relationships management apparatus.

FIG. 6 illustrates a diagram of an example relationships management apparatus 400.

As shown in FIG. 6, the apparatus 600 may include one or more processors 602, an input/output (I/O) component 604, a communication component 606, a key parsing component 607, and a memory 608. The input/output component 604 is configured to receive data/signal to be processed and to output the processed data/signal. The communication component 606 is configured to allow the apparatus 600 to communicate with other devices (not shown) over a network (not shown). The key parsing component 607 is configured to generate, manage, and/or validate various types of keys. Details regarding keys are provided throughout the disclosure. The memory 608 stores thereon computer-executable components executable by the one or more processors 602. The computer-executable components may include the following.

A user profile establishing component 610 is configured to establish, in a relationships management system, a user profile. The user profile may be associated with at least a first access level comprising a first plurality of functions and a second access level comprising a second plurality of functions. The first access level and the second access level may be defined based at least in part on data input via a user interface. A data entry associated with the first plurality of functions is associated with the second plurality of functions based at least in part on a data access token. Additional details of the user profile, access levels, and the plurality of functions are described throughout this disclosure and will not be repeated here.

A privacy control instruction receiving component 612 is configured to receive a privacy control instruction via a user interface of the relationships management system. In some instances, the user may control the privacy status of the content of the information flow of each access level. For example, the user may post a picture in a first user profile level. The user may input/select a privacy control instruction via the user interface to set the post as accessible/inaccessible to one or more people or the public. The user may also input/select a privacy control instruction via the user interface to set whether others could comment on the post. For example, the user may input/select a privacy control instruction via the user interface to set his/her profile as searchable/unsearchable to the public.

A privacy status setting component 614 is configured to a privacy status of the first access level at least partially in response to receiving the privacy control instruction. For example, the relationships management system may set the privacy status of a picture posted by the user in the first access level as accessible/inaccessible to one or more people or the public in response to receiving the privacy control instruction. For example, the relationships management system may set whether others could comment on the post in response to receiving the privacy control instruction. For example, the relationships management system may set the user profile as searchable/unsearchable to the public in response to receiving the privacy control instruction. Additional details of the operation of setting the privacy status are provided throughout the disclosure and are not repeated here.

A merge instruction receiving component 616 is configured to receive a merge instruction via the user interface. In some instances, the user may merge the data/content associated with different access levels. For example, the user may input/select a merge instruction via the user interface to merge the data in the first post application associated with the first access level and the data in the second post application associated with the second access level. For example, the user may input/select a merge instruction via the user interface to merge the data in the first calendar application associated with the first access level and the data in the second calendar application associated with the second access level.

A data merging component 618 is configured to merge the first data associated with the first access level and second data associated with the second access level at least partially in response to receiving the merge instruction. Additional details of the operation of merging are provided throughout the disclosure and are not repeated here.

An information flow sharing instruction receiving component 620 is configured to receive an information flow sharing instruction via the user interface. In some instances, the user may share information flow associated with different access levels. The information flow may include posts, chat history, the information in a library, the information in a calendar, etc. For example, the user may input/select an information flow sharing instruction via the user interface to share an information flow associated with the first access level with the second access level.

An information flow sharing component 622 is configured to share an information flow across the first access level and the second access level at least partially in response to receiving the information flow sharing instruction. Additional details of the operation of information flow sharing are provided throughout the disclosure and are not repeated here.

A temporary code generating instruction receiving component 624 is configured to receive a temporary code generating instruction via the user interface on a first computing device associated with a first user. In some instances, the first user may want to establish a temporary connection with a second user who may be a stranger. The temporary code may indicate temporary contact information of the first user and may be one-time effective. In such cases, the first user may input/select a temporary code generating instruction via the user interface on a first computing device. For example, the first user parks his/her car on the roadside. However, the first user does not want to block other's way and may want other people to contact him/her if his/her car block other's way. Meanwhile, the first user may want to protect his/her privacy and not want to make his/her phone number public.

A temporary code generating component 626 is configured to generate a temporary code at least partially in response to receiving the temporary code generating instruction. In some instances, the temporary code may be a bar code, a quick response (QR) code, a serial number, or anything else that can indicate contact information. For example, the first user may put the temporary code on the windshield (or anywhere visible to the outside) of his/her car for other people to contact him/her.

A message receiving component 628 is configured to receive a message from a second computing device associated with a second user. The message may indicate that the temporary code is captured by the second computing device. In some instances, the second user may capture the temporary code with the second computing device. For example, the first user's car blocks the way of the second user. The second user may use the second computing device to scan the temporary code on the first user's windscreen to obtain the temporary contact information of the first user. The second computing device may send a message to the relationships management system, indicating that the temporary code is captured by the second computing device.

A temporary connection establishing component 630 is configured to establish a temporary connection between the first computing device and the second computing device at least partially in response to receiving the message from the second computing device. In some instances, the temporary connection may include a phone call, a text chat, an audio call, a video call, a voice message, etc. The first user and the second user may not wish to contact each other after the temporary connection, and the temporary connection may be one-time effective. As such, a convenient temporary connection can be established between the first user and a stranger, while the first user does not need to expose his/her private information. Additional details of the temporary code are provided throughout the disclosure and are not repeated here.

A visiting request receiving component 632 is configured to receive a visiting request from another user profile. The visiting request may request to visit the first access level. In some instances, a second user may want to visit an access level (for example, "neighbors") associated with a first user profile. The second user may send the visiting request to the first user.

A first determination component 634 is configured to determine whether the visiting request is associated with an access key. In some instances, the information flow/content in the access level (for example, "neighbors") associated with the first user profile may be visited by other users or the public. The first user may define whether the access level can be visited, for example, based on the access key. The access key may be configured in the form of a visiting key, which is managed via the Dynamic Keys Management tool (DKM). Additional details of the keys and DKM are described throughout this disclosure.

A visiting allowing component 636 is configured to allow another user profile to visit the first access level at least partially in response to determining that the visiting request is associated with the access key.

A subscribing request receiving component 638 is configured to receive a subscribing request from another user profile. The subscribing request may request to subscribe to the first access level. In some instances, a second user may want to subscribe to an access level (for example, "my billboard") associated with a first user profile. The second user may send the subscribing request to the first user.

A subscribing allowing component 640 is configured to allow the other user profile to subscribe to the first access level at least partially in response to receiving the subscribing request. In some instances, the information flow/content in the access level (for example, "my billboard") associated with the first user profile may be subscribed by other users or the public. The first user may define whether the access level can be subscribed. The difference between subscribing and visiting may be that, visiting needs to be acknowledged by the first user, while subscribing may be allowed without verification.

In some instances, the subscribing request may include a subscribing key. The subscribing key associated with the second user may be configured for the situation where there is no need for approval/verification, i.e., the second user (subscriber) may have the subscribing key validated and activated immediately when the first user (the owner of the first access level) receives the subscribing key. The subscribing key may be managed via the Dynamic Keys Management tool (DKM). Additional details of the subscribing key and DKM are provided throughout the disclosure.

The difference between subscribing and visiting may be that, visiting needs to be acknowledged by the first user, while subscribing may be allowed without verification.

A mutual acceptance request receiving component 642 is configured to receive a mutual acceptance request from another user profile. The mutual acceptance request may request access to the first access level. In some instances, a second user may want to establish mutual acceptance in an access level (for example, "friends") associated with a first user profile. The second user may send the mutual acceptance request to the first user.

A second determination component 644 is configured to determine whether the mutual acceptance request is associated with an access key. The access key may be configured in the form of an imaged key, which is managed via the Dynamic Keys Management tool (DKM). Additional details of the imaged key and DKM are described throughout this disclosure.

A responding request sending component 646 is configured to send a responding request at least partially in response to determining that the mutual acceptance request is associated with the access key. The responding request may request access to a corresponding access level associated with another user profile.

A validated access key receiving component 648 is configured to receive a validated access key from another user profile.

A mutual acceptance allowing component 650 is configured to allow another user profile to access the first access level at least partially in response to receiving the validated access key.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer-readable storage media do not include communication media.

The computer-readable instructions stored on one or more non-transitory computer-readable storage media that, when executed by one or more processors, may perform operations described above with reference to the drawings. Generally, computer-readable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

EXAMPLE CLAUSES

Clause 1. A computer-implemented method, comprising: establishing, in a relationships management system, a user profile, the user profile being associated with at least: a first access level comprising a first plurality of functions; and a second access level comprising a second plurality of functions; wherein the first access level and the second access level are defined based at least in part on data input via a user interface.

Clause 2. The computer-implemented method as recited in Clause 1, wherein a data entry associated with the first plurality of functions is associated with the second plurality of functions based at least in part on a data access token.

Clause 3. The computer-implemented method as recited in Clause 1, further comprising an access level of opening, the access level of opening being customizable via the user interface.

Clause 4. The computer-implemented method as recited in Clause 3, wherein the access level of opening is customizable via the user interface along a timeline.

Clause 5. The computer-implemented method as recited in Clause 1, wherein the first plurality of functions includes at least one of: a first contacts application; a first dialogue application; a first post application; a first library application; a first calendar application; or one or more customizable applications.

Clause 6. The computer-implemented method as recited in Clause 5, wherein the first plurality of functions is configured via a relationship building tool (I-Rapport).

Clause 7. The computer-implemented method as recited in Clause 1, wherein the second plurality of functions comprises at least one of: a second contacts application; a second dialogue application; a second post application; a second library application; a second calendar application; or one or more customizable applications.

Clause 8. The computer-implemented method as recited in Clause 7, wherein the second plurality of functions is configured via a relationship building tool (I-Rapport).

Clause 9. The computer-implemented method as recited in Clause 1, further comprising: receiving a privacy control instruction via the user interface; and setting a privacy status of the first access level at least partially in response to receiving the privacy control instruction.

Clause 10. The computer-implemented method as recited in Clause 9, wherein the receiving the privacy control instruction via the user interface is implemented via an information flow management tool (InFlux); and the setting the privacy status of the first access level is implemented via the information flow management tool (InFlux).

Clause 11. The computer-implemented method as recited in Clause 9, a sub-organization management tag is configured to indicate the privacy status of the first access level.

Clause 12. The computer-implemented method as recited in Clause 1, further comprising: receiving a merge instruction via the user interface; and merging first data associated with the first access level and second data associated with the second access level at least partially in response to receiving the merge instruction.

Clause 13. The computer-implemented method as recited in Clause 12, wherein the receiving the merge instruction via the user interface is implemented via an information flow management tool (InFlux); and the merging the first data associated with the first access level and the second data associated with the second access level is implemented via the information flow management tool (InFlux).

Clause 14. The computer-implemented method as recited in Clause 1, further comprising: receiving an information flow sharing instruction via the user interface; and sharing an information flow associated with the first access level with the second access level at least partially in response to receiving the information flow sharing instruction.

Clause 15. The computer-implemented method as recited in Clause 14, wherein the receiving the information flow sharing instruction via the user interface is implemented via an information flow management tool (InFlux); and the sharing an information flow associated with the first access level with the second access level is implemented via the information flow management tool (InFlux).

Clause 16. The computer-implemented method as recited in Clause 1, further comprising: receiving a temporary code generating instruction via the user interface on a first computing device associated with a first user; generating, by the relationships management system, a temporary code at least partially in response to receiving the temporary code generating instruction; receiving a message from a second computing device associated with a second user, the message indicating that the temporary code is captured by the second computing device; and establishing a temporary connection between the first computing device and the second computing device at least partially in response to receiving the message from the second computing device.

Clause 17. The computer-implemented method as recited in Clause 1, further comprising: receiving a visiting request from another user profile, the visiting request requesting to visit the first access level; determining whether the visiting request is associated with an access key; and allowing the another user profile to visit the first access level at least partially in response to determining that the visiting request is associated with the access key.

Clause 18. The computer-implemented method as recited in Clause 17, wherein the access key is a visiting key managed via a Dynamic Keys Management tool (DKM).

Clause 19. The computer-implemented method as recited in Clause 1, further comprising: receiving a subscribing request from another user profile, the subscribing request requesting to subscribe to the first access level; and allowing the other user profile to subscribe to the first access level at least partially in response to receiving the subscribing request.

Clause 20. The computer-implemented method as recited in Clause 19, wherein the subscribing request includes a subscribing key managed via a Dynamic Keys Management tool (DKM).

Clause 21. The computer-implemented method as recited in Clause 1, further comprising: receiving a mutual acceptance request from another user profile, the mutual acceptance request requesting access to the first access level; determining whether the mutual acceptance request is associated with an access key; sending a responding request at least partially in response to determining that the mutual acceptance request is associated with the access key, the responding request requesting access to a corresponding access level associated with the another user profile; receiving a validated access key from the another user profile; and allowing the another user profile to access the first access level at least partially at least partially in response to receiving the validated access key.

Clause 22. The computer-implemented method as recited in Clause 21, wherein the access key is an imaged key managed via a Dynamic Keys Management tool (DKM).

Clause 23. The computer-implemented method as recited in Clause 1, wherein the relationships management system further includes a Dynamic Keys Management tool (DKM), the DKM is configured to manage one or more keys; and wherein an expression of a key of the one or more keys is X-(Y C's Name) Y1-TK-No. wherein X represents a holder of the key; C's name represents a caption of an access level; Y represents a creator of the access level; Y1 represents an imager and an issuer of the key; TK represents a type of the key; No. represents a sequence number in the access level.

Clause 24. The computer-implemented method as recited in Clause 23, wherein the type of the key is represented by Boolean operators including IUI, IU0, 0UI, and 0U0; and wherein IUI indicates an imaged key type, IU0 indicates a visiting key type, 0UI indicates a subscribing key type, and 0U0 indicates an invalid key type.

Clause 25. The computer-implemented method as recited in Clause 1, wherein the relationships management system further comprises a relationships management platform tool (RMP), configured to provide a shortcut of sharing storage space to users within the same access level.

Clause 26. The computer-implemented method as recited in Clause 25, wherein relationships management platform is further configured to automatically fill in information associated with the user at an interface to a third-party vendor, when the user logs in to the interface of the third-party vendor through the relationships management system.

Clause 27. The computer-implemented method as recited in Clause 1, wherein the relationships management system further comprises a Human Behavior Assisted Artificial Intelligence tool (HBA-AI), configured to establish an AI model with social behavior data of a user.

Clause 28. An apparatus, comprising: one or more processors; and memory communicatively coupled to the one or more processors, the memory storing computer-executable instructions executable by the one or more processors, the computer-executable components including: a user profile establishing component, configured to establish, in a relationships management system, a user profile, the user profile being associated with at least: a first access level comprising a first plurality of functions; and a second access level comprising a second plurality of functions; wherein the first access level and the second access level are defined based at least in part on data input via a user interface.

Clause 29. The apparatus of Clause 28, wherein a data entry associated with the first plurality of functions is associated with the second plurality of functions based at least in part on a data access token.

Clause 30. The apparatus of Clause 28, the computer-executable components further comprising: a privacy control instruction receiving component, configured to receive a privacy control instruction via a user interface of the relationships management system; and a privacy status setting component, configured to a privacy status of the first access level at least partially in response to receiving the privacy control instruction.

Clause 31. The apparatus of Clause 28, the computer-executable components further comprising: a merge instruction receiving component, configured to receive a merge instruction via the user interface; and a data merging component, configured to merge first data associated with the first access level and second data associated with the second access level at least partially in response to receiving the merge instruction.

Clause 32. One or more non-transitory computer-readable media, stored thereon computer-readable instructions that, when executed by one or more processors, cause the one or more processors to perform acts comprising: establishing, in a relationships management system, a user profile, the user profile being associated with at least: a first access level comprising a first plurality of functions; and a second access level comprising a second plurality of functions; wherein the first access level and the second access level are defined based at least in part on data input via a user interface.

Clause 33. The one or more non-transitory computer-readable media as recited in Clause 32, wherein a data entry associated with the first plurality of functions is associated with the second plurality of functions based at least in part on a data access token.

Clause 34. The one or more non-transitory computer-readable media as recited in Clause 32, wherein: the first plurality of functions includes at least one of: a first contacts application; a first dialogue application; a first post application; a first library application; a first calendar application; or one or more customizable applications; and the second plurality of functions comprises at least one of: a second contacts application; a second dialogue application; a second post application; a second library application; a second calendar application; or one or more customizable applications.

Clause 35. The one or more non-transitory computer-readable media as recited in Clause 34, wherein the first plurality of functions and the second plurality of functions are configured via a relationship building tool (I-Rapport).

While the example clauses described above are described with respect to one particular implementation, it should be understood that, in the context of this document, the content of the example clauses can also be implemented via a method, device, system, computer-readable medium, and/or another implementation. Additionally, any of clauses 1-35 may be implemented alone or in combination with any other one or more of the clauses 1-35.

What is claimed is:

1. A computer-implemented method, comprising:
    establishing, in a relationships management system, a user profile, the user profile being associated with at least:
        a first access level comprising a first plurality of applications, wherein a data entry is associated with a first application of the first plurality of applications; and
        a second access level comprising a second plurality of applications;
    wherein the first access level and the second access level are defined based at least in part on data input via a user interface, and wherein access to the first access level or the second access level is based at least in part on a key of a plurality of data keys, the plurality of data keys comprising a first key associated with mutual confirmation by a first entity and a second entity, a second key associated with confirmation by an administrator, and a third key associated with unilateral confirmation, wherein a type of data access token is determined by the user profile;
    receiving, from a second application of the second plurality of applications, a data access token; and
    accessing, based at least in part on the data access token and the key, the data entry via the second application of the second plurality of applications,
    wherein the relationships management system further includes a Dynamic Keys Management tool, the Dynamic Keys Management tool configured to manage the plurality of data keys; and
    wherein an expression of a key of the plurality of data keys is $X$-($Y$ $C's$ Name)$Y1$-TK-No.

wherein X represents a holder of the key; C's name represents a caption of an access level; Y represents a creator of the access level; Y1 represents an imager and an issuer of the key; TK represents a type of the key; and No. represents a sequence number in the access level.

2. The computer-implemented method as recited in claim 1, wherein the data entry associated with the first plurality of applications is associated with the second plurality of applications based at least in part on the data access token.

3. The computer-implemented method as recited in claim 1, further comprising an access level of opening, the access level of opening being customizable via the user interface along a timeline.

4. The computer-implemented method as recited in claim 1, wherein the first plurality of applications includes at least one of:
    a first contacts application;
    a first dialogue application;
    a first post application;
    a first library application;
    a first calendar application; or
    one or more first customizable applications; and
wherein the second plurality of applications comprises at least one of:
    a second contacts application;
    a second dialogue application;
    a second post application;
    a second library application;
    a second calendar application; or
    one or more second customizable applications.

5. The computer-implemented method as recited in claim 4, wherein the first plurality of applications and the second plurality of applications are configured via a relationship building tool.

6. The computer-implemented method as recited in claim 1, further comprising:
    receiving a privacy control instruction via the user interface; and
    setting a privacy status of the first access level at least partially in response to receiving the privacy control instruction.

7. The computer-implemented method as recited in claim 1, further comprising:
    receiving a merge instruction via the user interface; and
    merging first data associated with the first access level and second data associated with the second access level at least partially in response to receiving the merge instruction.

8. The computer-implemented method as recited in claim 1, further comprising:
    receiving an information flow sharing instruction via the user interface; and
    sharing an information flow associated with the first access level with the second access level at least partially in response to receiving the information flow sharing instruction.

9. The computer-implemented method as recited in claim 8, wherein:
    the receiving the information flow sharing instruction via the user interface is implemented via an information flow management tool; and
    the sharing the information flow associated with the first access level with the second access level is implemented via the information flow management tool.

10. The computer-implemented method as recited in claim 1, further comprising:
    receiving a temporary code generating instruction via the user interface on a first computing device associated with a first user;
    generating, by the relationships management system, a temporary code at least partially in response to receiving the temporary code generating instruction;
    receiving a message from a second computing device associated with a second user, the message indicating that the temporary code is captured by the second computing device; and
    establishing a temporary connection between the first computing device and the second computing device at least partially in response to receiving the message from the second computing device.

11. The computer-implemented method as recited in claim 1, further comprising:
    receiving a visiting request from another user profile, the visiting request requesting to visit the first access level;
    determining whether the visiting request is associated with the second key; and
    allowing the another user profile to visit the first access level at least partially in response to determining that the visiting request is associated with the second key.

12. The computer-implemented method as recited in claim 11, wherein the second key is managed via the Dynamic Keys Management tool.

13. The computer-implemented method as recited in claim 1, further comprising:

receiving a subscribing request from another user profile, the subscribing request requesting to subscribe to the first access level; and allowing the another user profile to subscribe to the first access level at least partially in response to receiving the subscribing request.

14. The computer-implemented method as recited in claim 1, further comprising:

receiving a mutual acceptance request from another user profile, the mutual acceptance request requesting access to the first access level;

determining whether the mutual acceptance request is associated with the first key;

sending a responding request at least partially in response to determining that the mutual acceptance request is associated with the first key, the responding request requesting access to a corresponding access level associated with the another user profile;

receiving a validated first key from the another user profile; and allowing the another user profile to access the first access level at least partially at least partially in response to receiving the validated first key.

15. The computer-implemented method as recited in claim 14, wherein the first key is managed via a Dynamic Keys Management tool.

16. The computer-implemented method as recited in claim 1, wherein the relationships management system further comprises a relationships management platform tool, configured to provide a shortcut of sharing storage space to users within a same access level.

17. The computer-implemented method as recited in claim 16, wherein relationships management platform is further configured to automatically fill in information associated with the user profile at an interface of a third-party vendor, when a user associated with the user profile logs in to the interface of the third-party vendor through the relationships management system.

18. The computer-implemented method as recited in claim 1, wherein the relationships management system further comprises a Human Behavior Assisted Artificial Intelligence tool, configured to establish an Artificial Intelligence model with social behavior data of a user.

19. An apparatus, comprising:

one or more processors; and one or more non-transitory computer readable media storing computer executable instructions that, when executed, cause the one or more processors to perform operations including:

establishing, in a relationships management system, a user profile, the user profile being associated with at least:

a first access level comprising a first plurality of applications, wherein a data entry is associated with a first application of the first plurality of applications; and a second access level comprising a second plurality of applications;

wherein the first access level and the second access level are defined based at least in part on data input via a user interface, and wherein access to the first access level or the second access level is based at least in part on a key of a plurality of data keys, the plurality of data keys comprising a first key associated with mutual confirmation by a first entity and a second entity, a second key associated with confirmation by an administrator, and a third key associated with unilateral confirmation, wherein a type of data access token is determined by the user profile;

receiving, from a second application of the second plurality of applications, a data access token; and accessing, based at least in part on the data access token and the key, the data entry via the second application of the second plurality of applications, wherein the relationships management system further includes a Dynamic Keys Management tool, the Dynamic Keys Management tool configured to manage the plurality of data keys; and wherein an expression of a key of the plurality of data keys is $X$-($Y$ $C$'s Name)$Y1$-TK-No.

wherein X represents a holder of the key; C's name represents a caption of an access level; Y represents a creator of the access level; Y1 represents an imager and an issuer of the key; TK represents a type of the key; and No. represents a sequence number in the access level.

20. One or more non-transitory computer-readable media, stored thereon computer-readable instructions that, when executed by one or more processors, cause the one or more processors to perform acts comprising:

establishing, in a relationships management system, a user profile, the user profile being associated with at least:

a first access level comprising a first plurality of applications, wherein a data entry is associated with a first application of the first plurality of applications; and a second access level comprising a second plurality of applications;

wherein the first access level and the second access level are defined based at least in part on data input via a user interface, and wherein access to the first access level or the second access level is based at least in part on a key of a plurality of data keys, the plurality of data keys comprising a first key associated with mutual confirmation by a first entity and a second entity, a second key associated with confirmation by an administrator, and a third key associated with unilateral confirmation, wherein a type of data access token is determined by the user profile;

receiving, from a second application of the second plurality of applications, a data access token; and accessing, based at least in part on the data access token and the key, the data entry via the second application of the second plurality of applications, wherein the relationships management system further includes a Dynamic Keys Management tool, the Dynamic Keys Management tool configured to manage the plurality of data keys; and wherein an expression of a key of the plurality of data keys is $X$-($Y$ $C$'s Name)$Y1$-TK-No.

wherein X represents a holder of the key; C's name represents a caption of an access level; Y represents a creator of the access level; Y1 represents an imager and an issuer of the key; TK represents a type of the key; and No. represents a sequence number in the access level.

* * * * *